US007012702B2

(12) United States Patent
Fujiwara et al.

(10) Patent No.: US 7,012,702 B2
(45) Date of Patent: Mar. 14, 2006

(54) MEASURING APPARATUS

(75) Inventors: Nariaki Fujiwara, Kyoto (JP); Atsushi Tamada, Kyoto (JP); Ryusuke Yamamoto, Kyoto (JP)

(73) Assignee: Dainippon Screen Mfg. Co., Ltd., (JP)

( * ) Notice: Subject to any disclaimer, the term of this patent is extended or adjusted under 35 U.S.C. 154(b) by 304 days.

(21) Appl. No.: 10/337,168

(22) Filed: Jan. 6, 2003

(65) Prior Publication Data

US 2003/0133133 A1 Jul. 17, 2003

(30) Foreign Application Priority Data

Jan. 9, 2002 (JP) ........................... P2002-002574

(51) Int. Cl.
*G01B 11/14* (2006.01)

(52) U.S. Cl. ....................................... 356/614; 356/315

(58) Field of Classification Search ........ 356/614–624, 356/630–632
See application file for complete search history.

(56) References Cited

U.S. PATENT DOCUMENTS

| | | | | |
|---|---|---|---|---|
| 5,644,400 | A * | 7/1997 | Mundt | 356/400 |
| 6,181,427 | B1 * | 1/2001 | Yarussi et al. | 356/445 |
| 6,256,100 | B1 | 7/2001 | Banet et al. | |
| 6,624,433 | B1 * | 9/2003 | Okumura et al. | 356/620 |
| 6,624,897 | B1 * | 9/2003 | Little | 356/614 |
| 6,710,886 | B1 * | 3/2004 | Park et al. | 356/614 |
| 6,741,363 | B1 * | 5/2004 | Kaupert | 356/602 |
| 6,924,072 | B1 * | 8/2005 | Hong et al. | 356/400 |

FOREIGN PATENT DOCUMENTS

| | | |
|---|---|---|
| JP | 2288326 | 11/1990 |

(Continued)

OTHER PUBLICATIONS

English translation of Abstract for Japanese Patent Application Laid-Open No. 2-288326.

(Continued)

*Primary Examiner*—Michael P. Stafira
*Assistant Examiner*—Juan D. Valentin, II
(74) *Attorney, Agent, or Firm*—Ostrolenk, Faber, Gerb & Soffen, LLP

(57) ABSTRACT

A width measuring apparatus is provided with a control unit, an imaging system and a spectroscopic unit. The control unit performs image processing (edge detection processing) on image data obtained by imaging an end of a substrate thereby detecting the position of the end of the substrate. The control unit further measures the thickness of a thin film on the basis of a spectral signal from the spectroscopic unit and detects the position of an end of the thin film from distribution of the thickness. The control unit calculates and displays the width between the end of the thin film and the end of the substrate on the basis of the detected positions of the ends of the substrate and the thin film. The width measuring apparatus can also detect the position of the end of the thin film from image data acquired by the imaging system. Therefore, it is possible to provide a measuring apparatus automatically measuring the width between the end of the thin film formed on the substrate and the end of the substrate.

13 Claims, 37 Drawing Sheets

FOREIGN PATENT DOCUMENTS

| | | |
|---|---|---|
| JP | 3-167406 | 7/1991 |
| JP | 04-60404 | 2/1992 |
| JP | 5175117 | 7/1993 |
| JP | 9-5020 | 1/1997 |
| JP | 9213616 | 8/1997 |
| JP | 2001-4326 | 1/2001 |
| JP | 2001-118781 | 4/2001 |
| JP | 2001127036 | 5/2001 |
| JP | 2001-153620 | 6/2001 |
| JP | 2002508081 | 3/2002 |
| WO | WO 03/028089 | 4/2003 |

OTHER PUBLICATIONS

English translation of Abstract for Japanese Patent Application Laid-Open No. 5-175117.

English translation of Abstract for Japanese Patent Application Laid-Open No. 9-213616.

English translation of Abstract for Japanese Patent Application Laid-Open No. 2001-127036.

English translation of Abstract for Japanese Patent Application Laid-Open No. 2002-508081.

* cited by examiner

F I G . 1
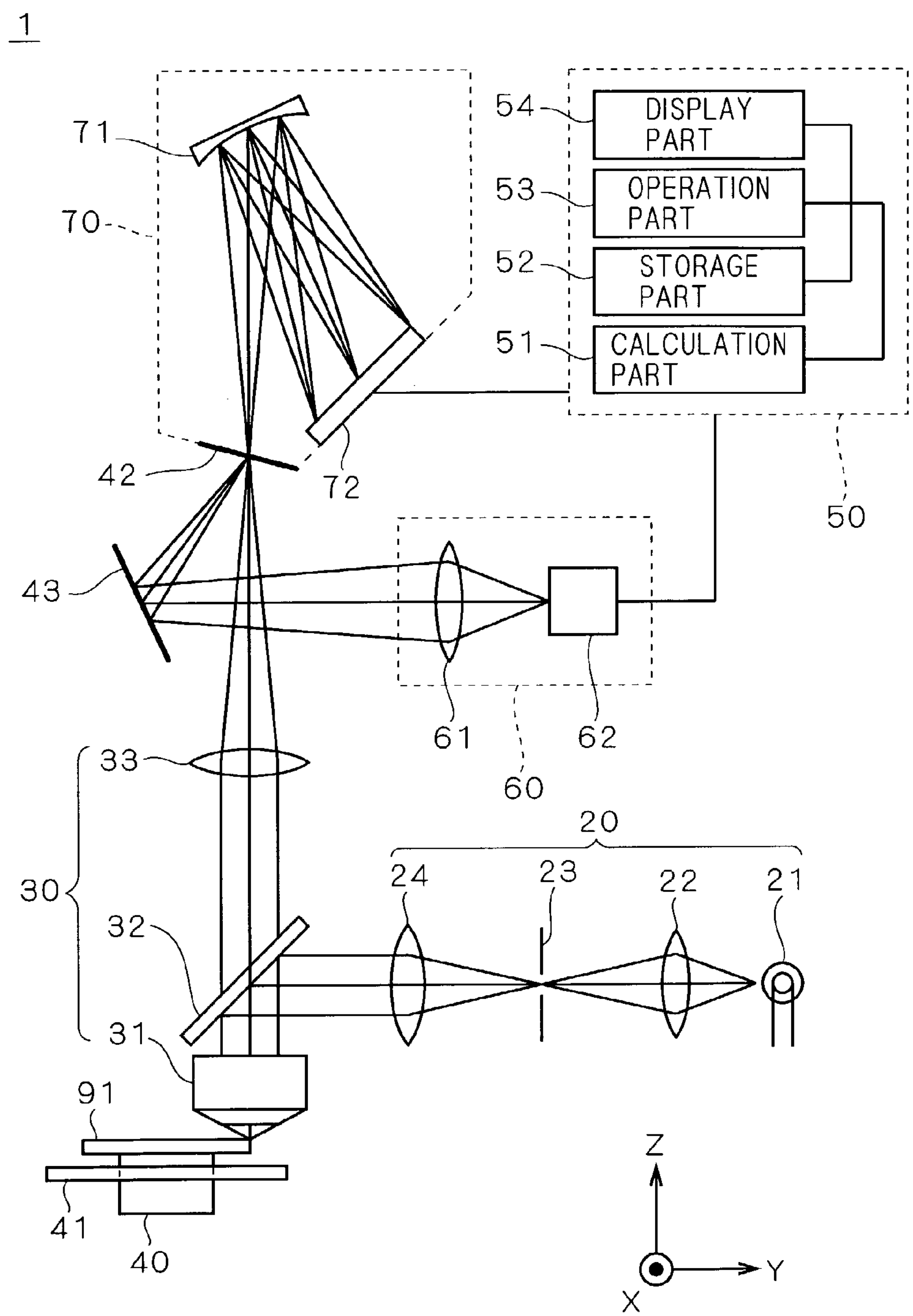

F I G . 2
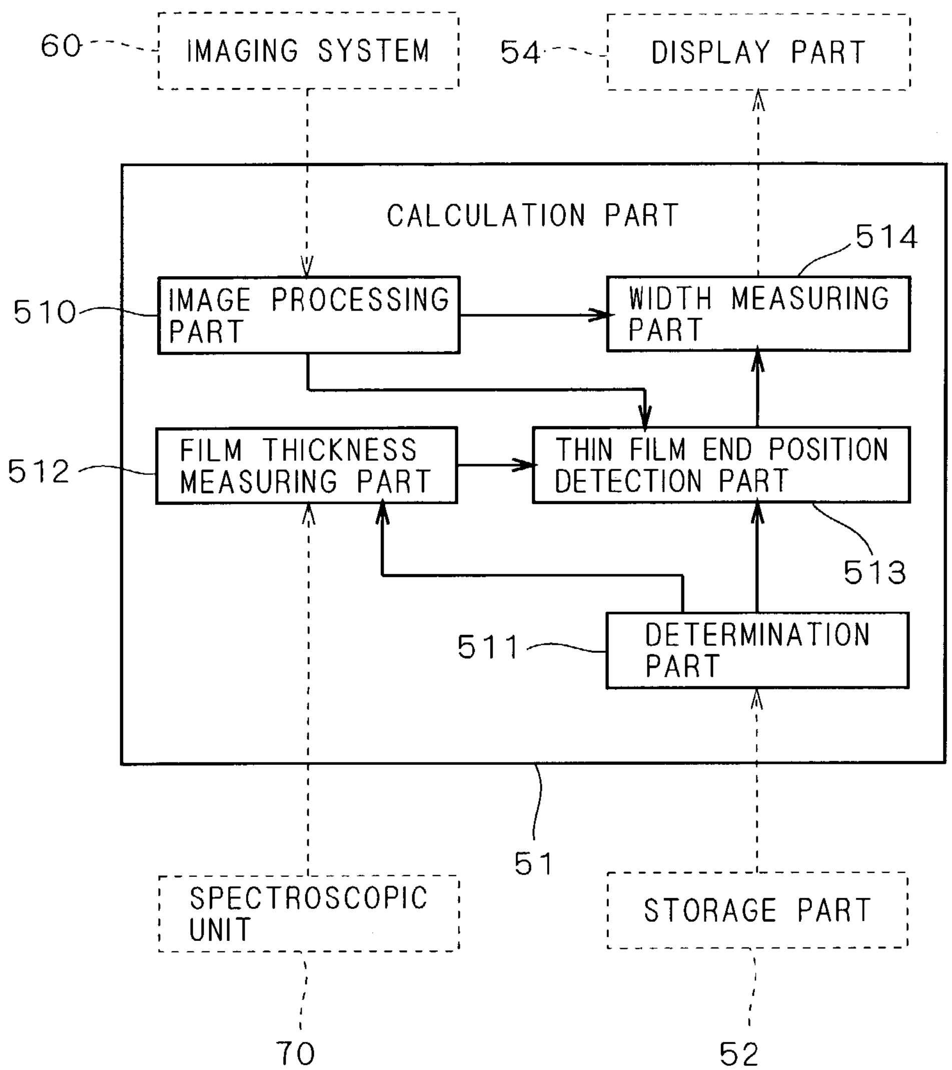

F I G . 3
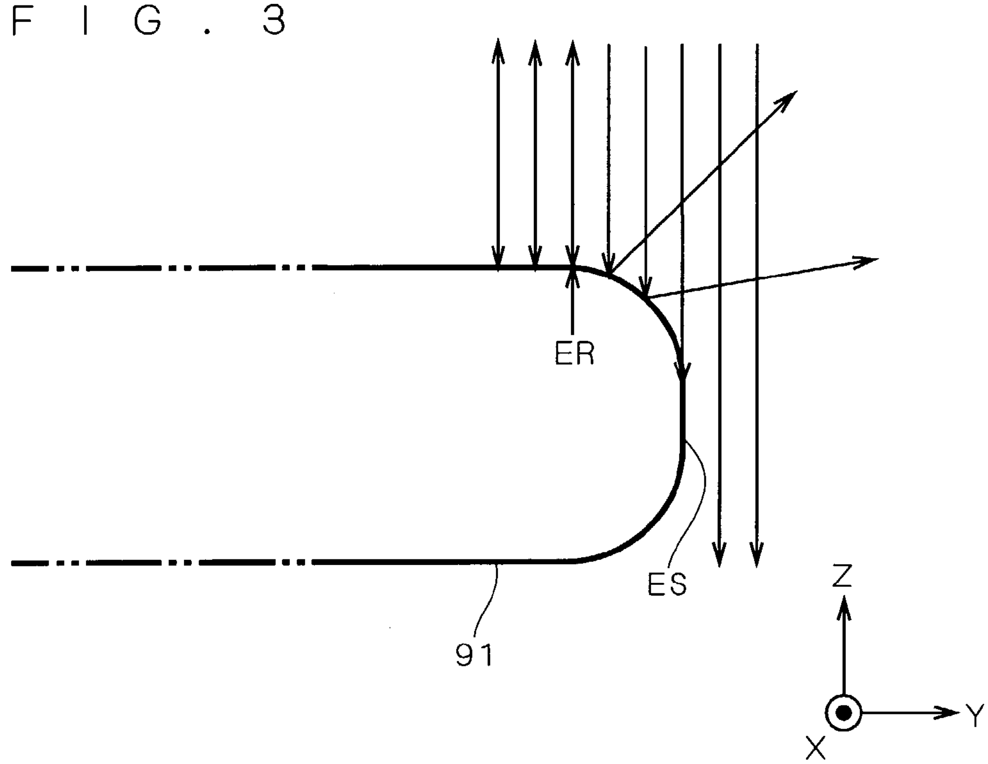
F I G . 4
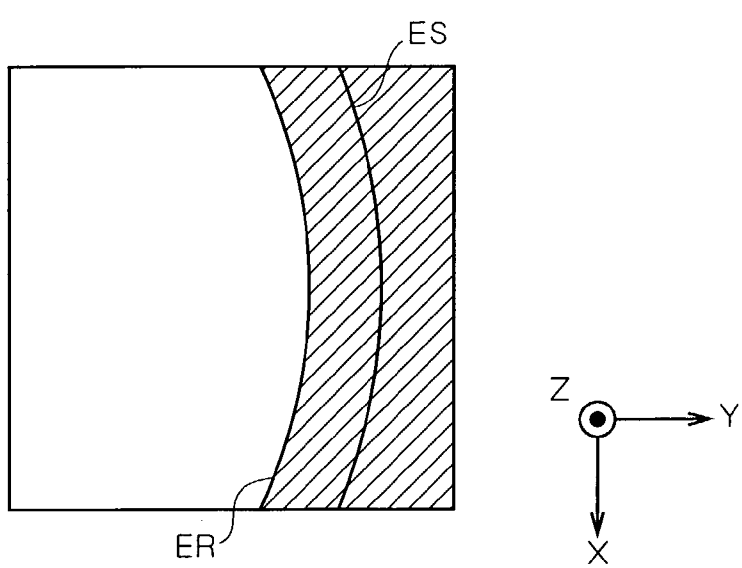

F I G . 5
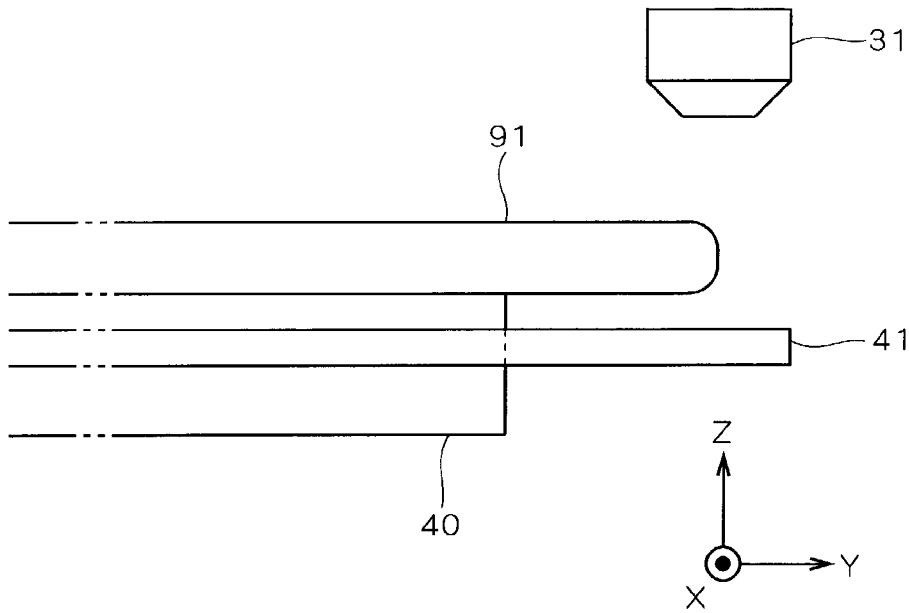
F I G . 6
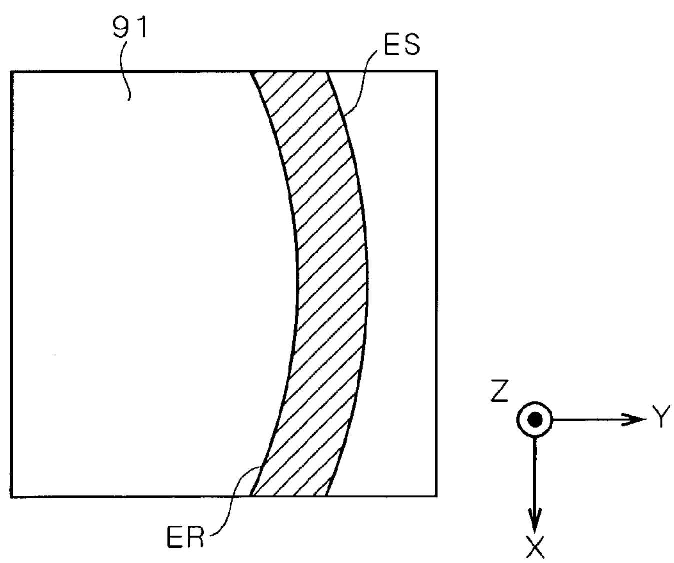

F I G . 9
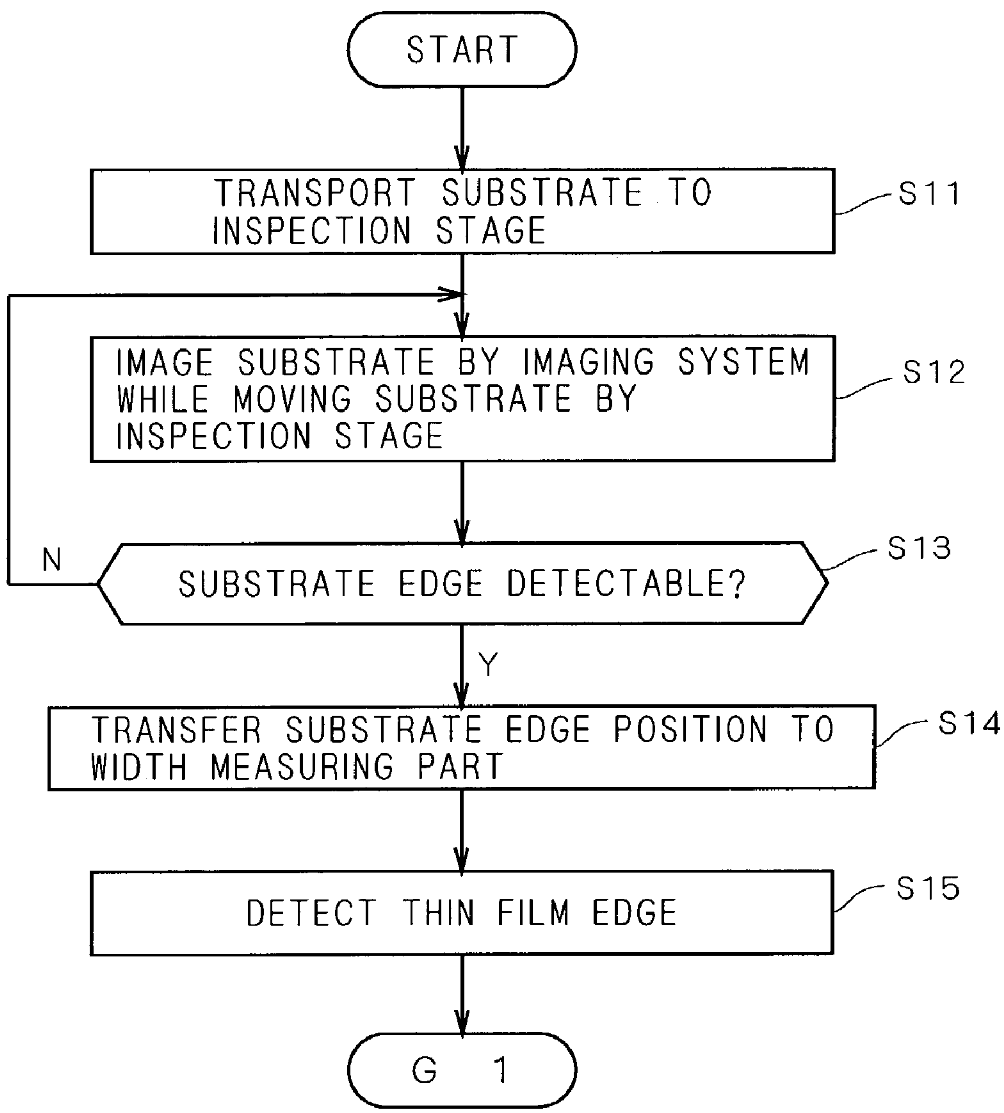

F I G . 1 2
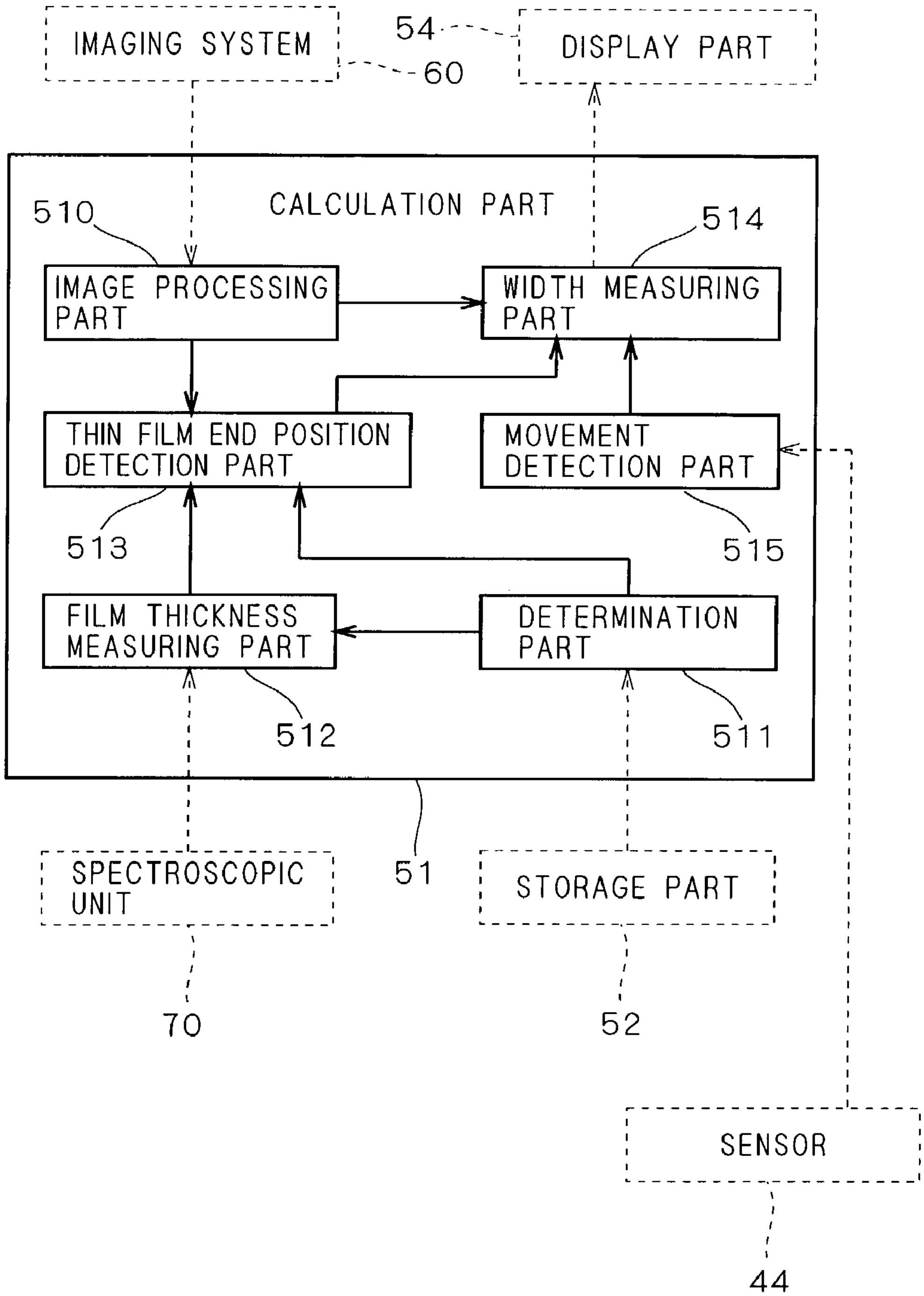

F I G . 1 3
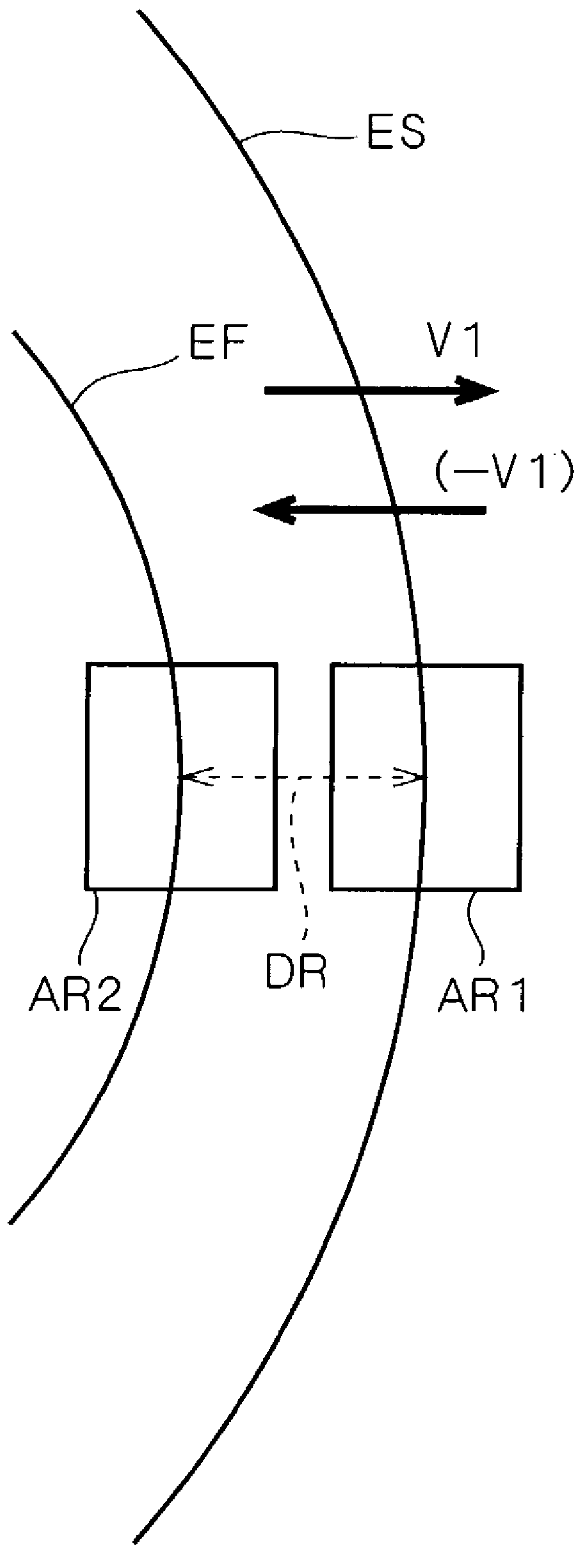

F I G . 1 4
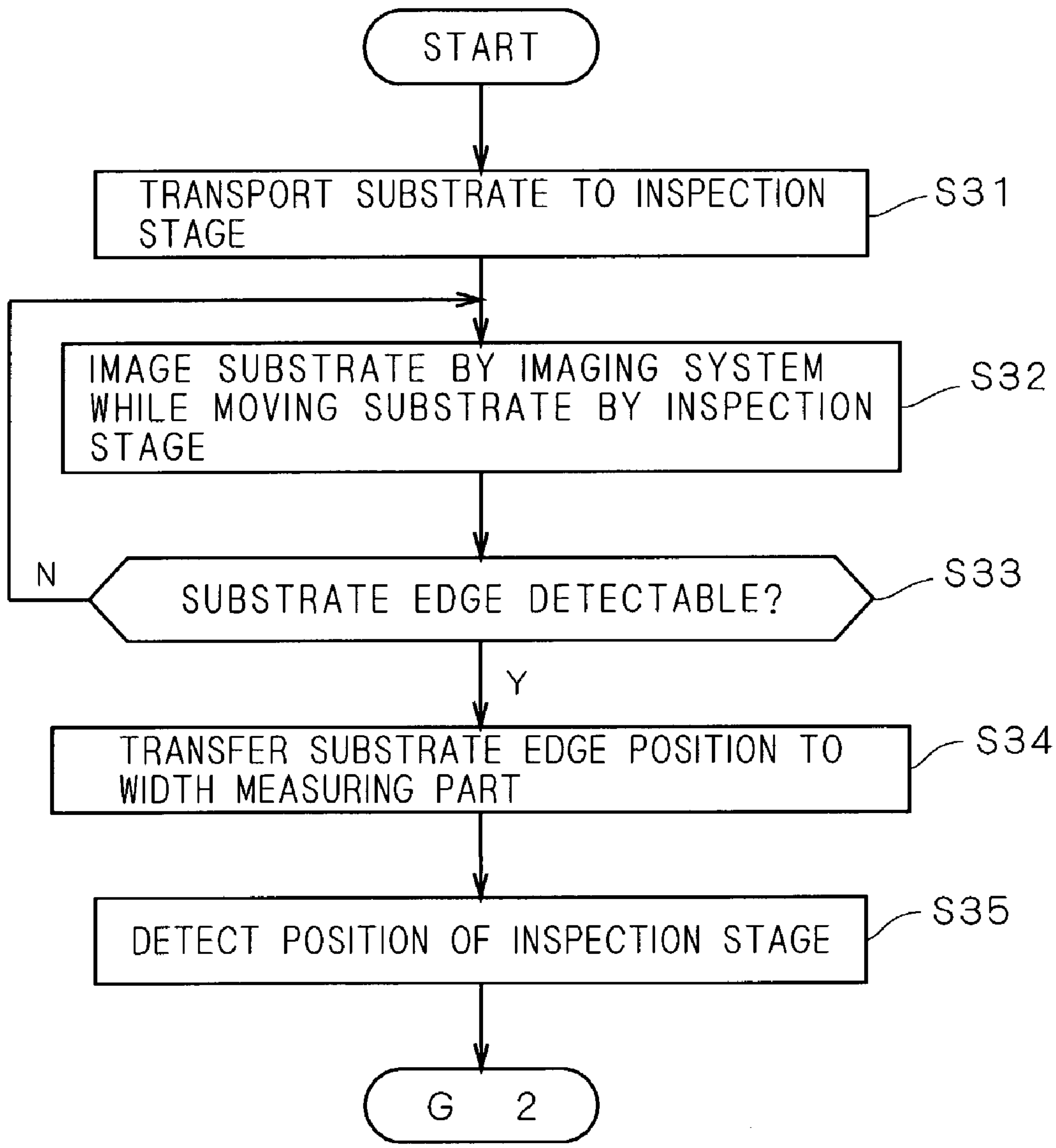

F I G . 1 5
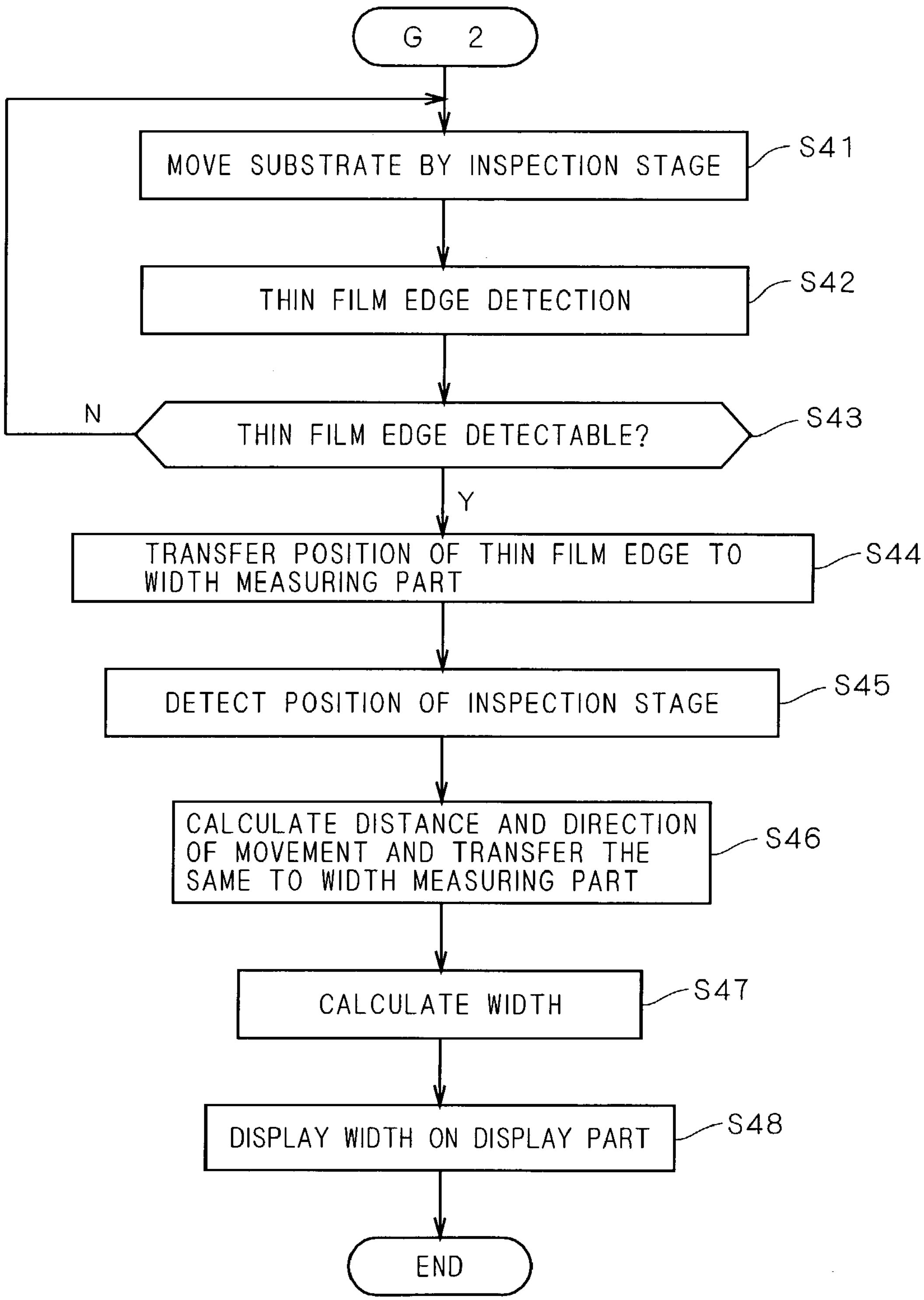

F I G . 1 6
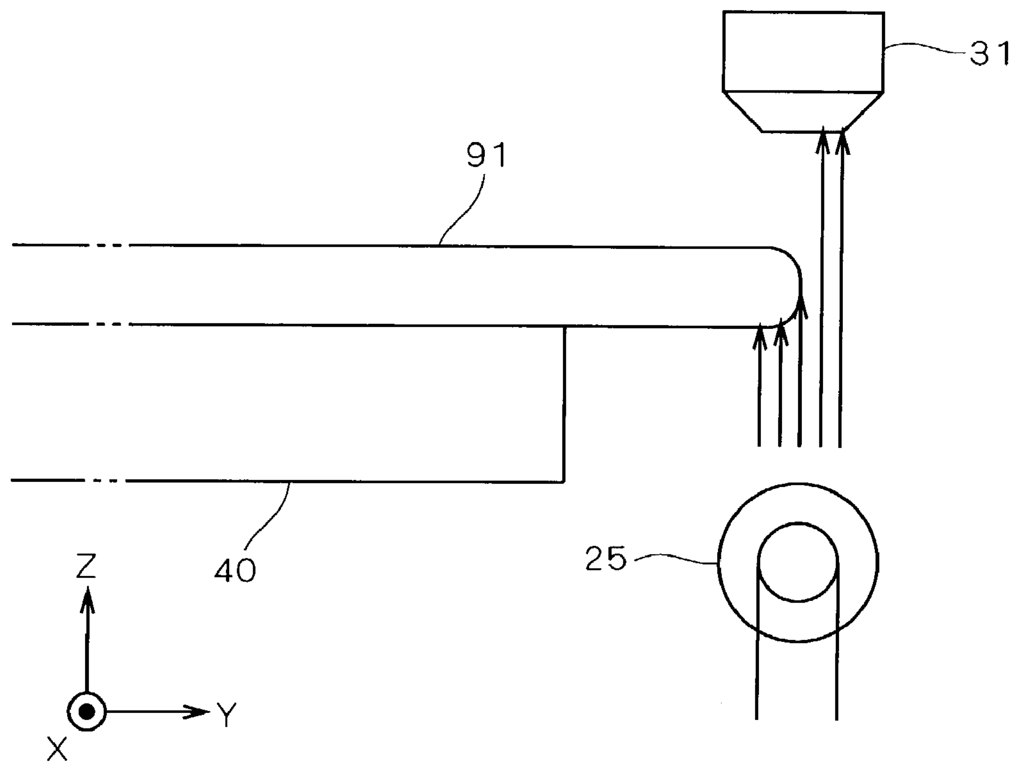
F I G . 1 7
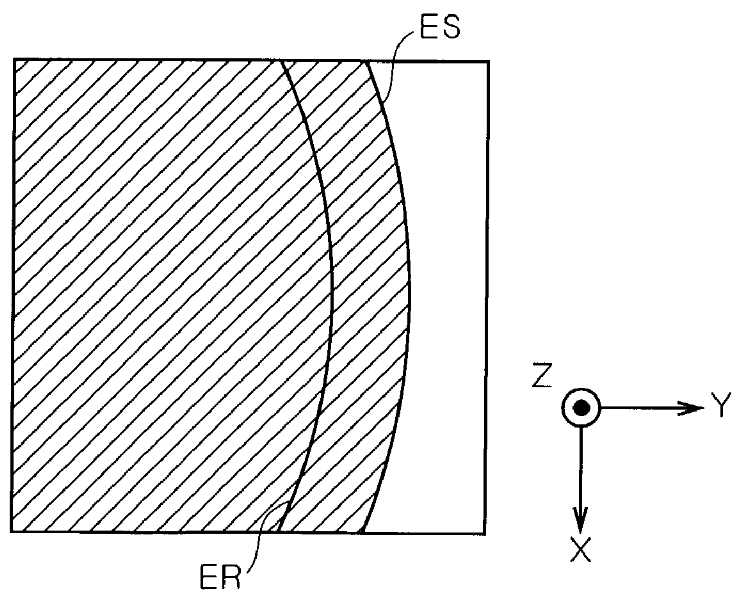

F I G . 1 8
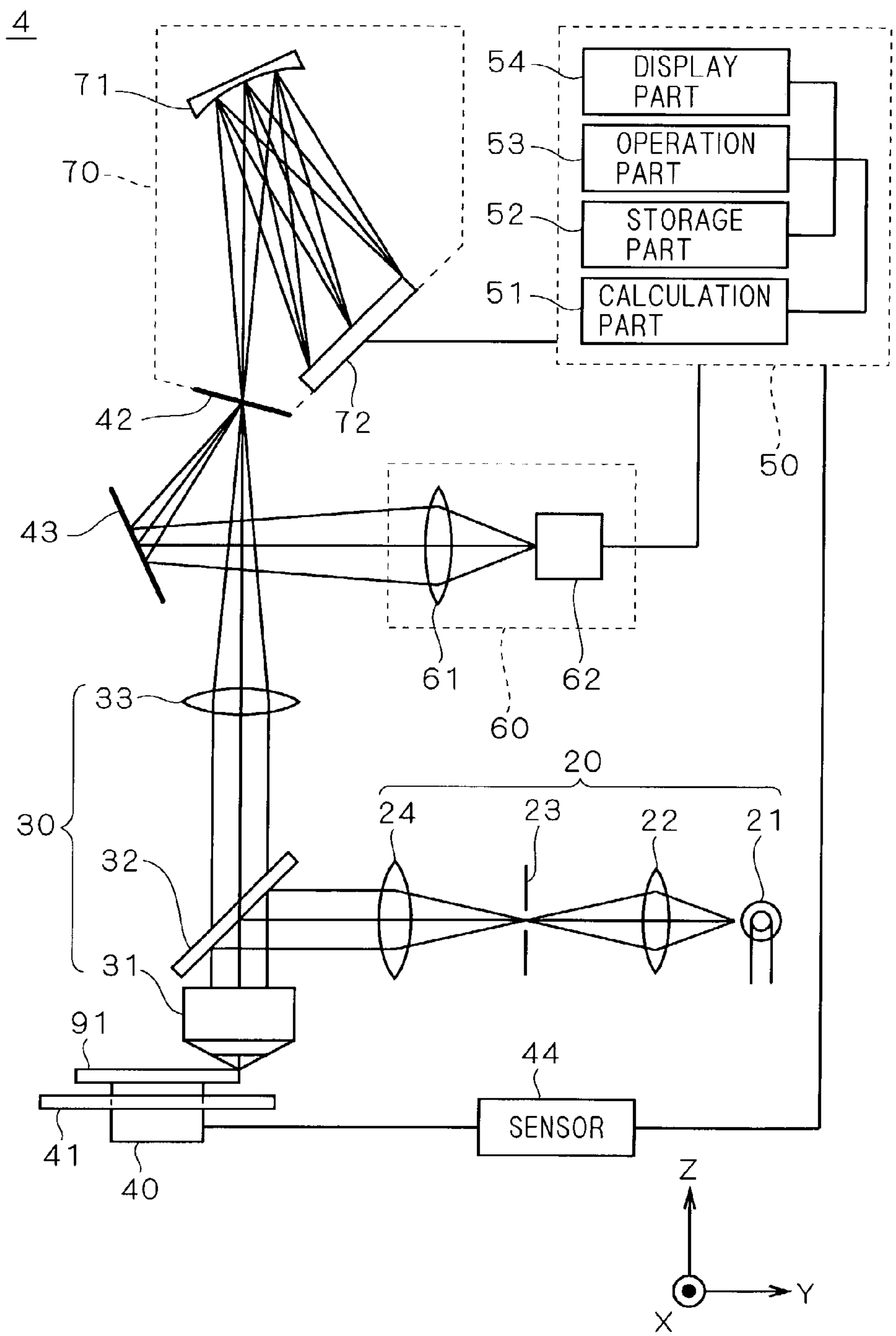

F I G . 1 9
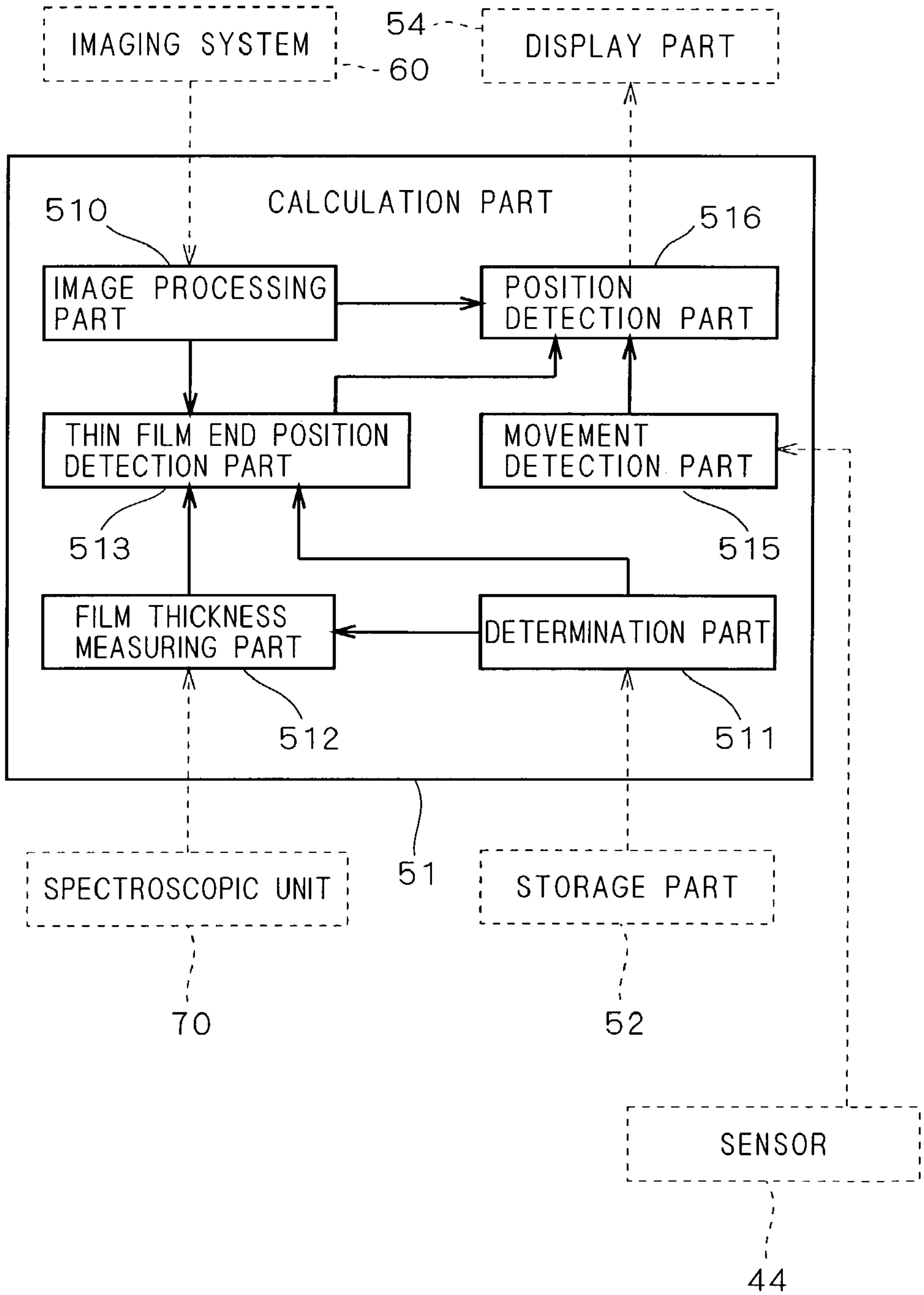

F I G . 2 0
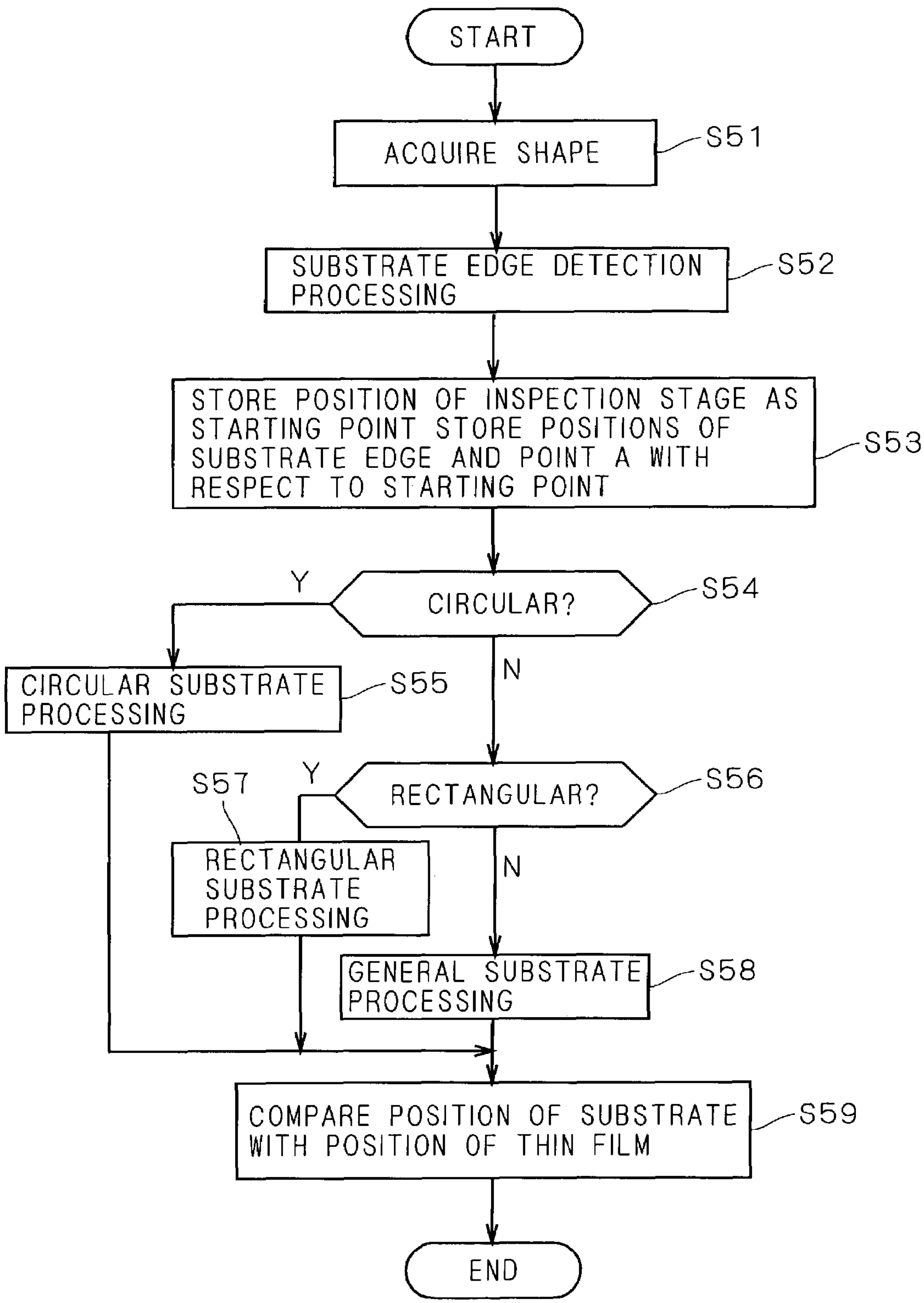

F I G . 2 1
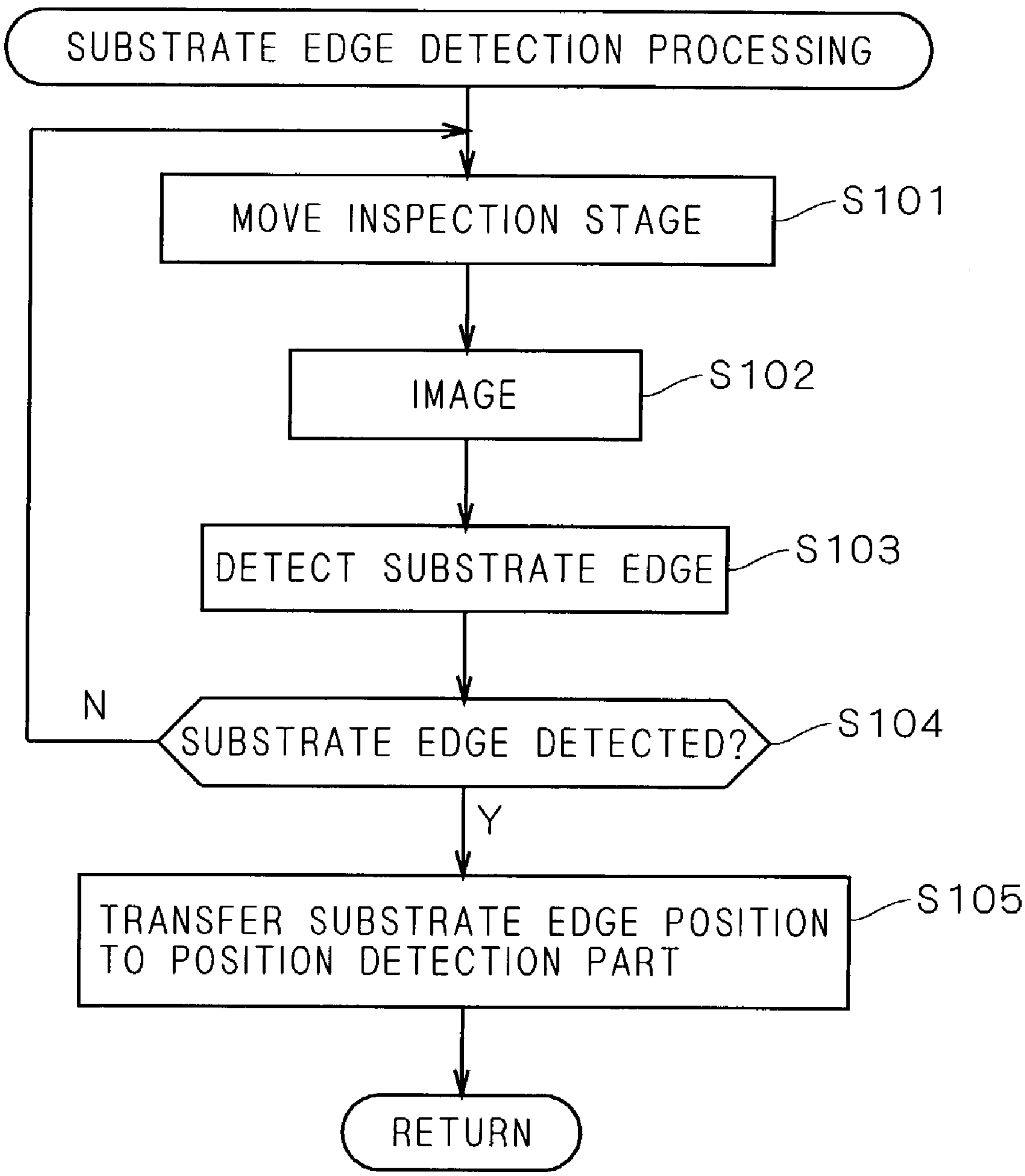

F I G . 2 7
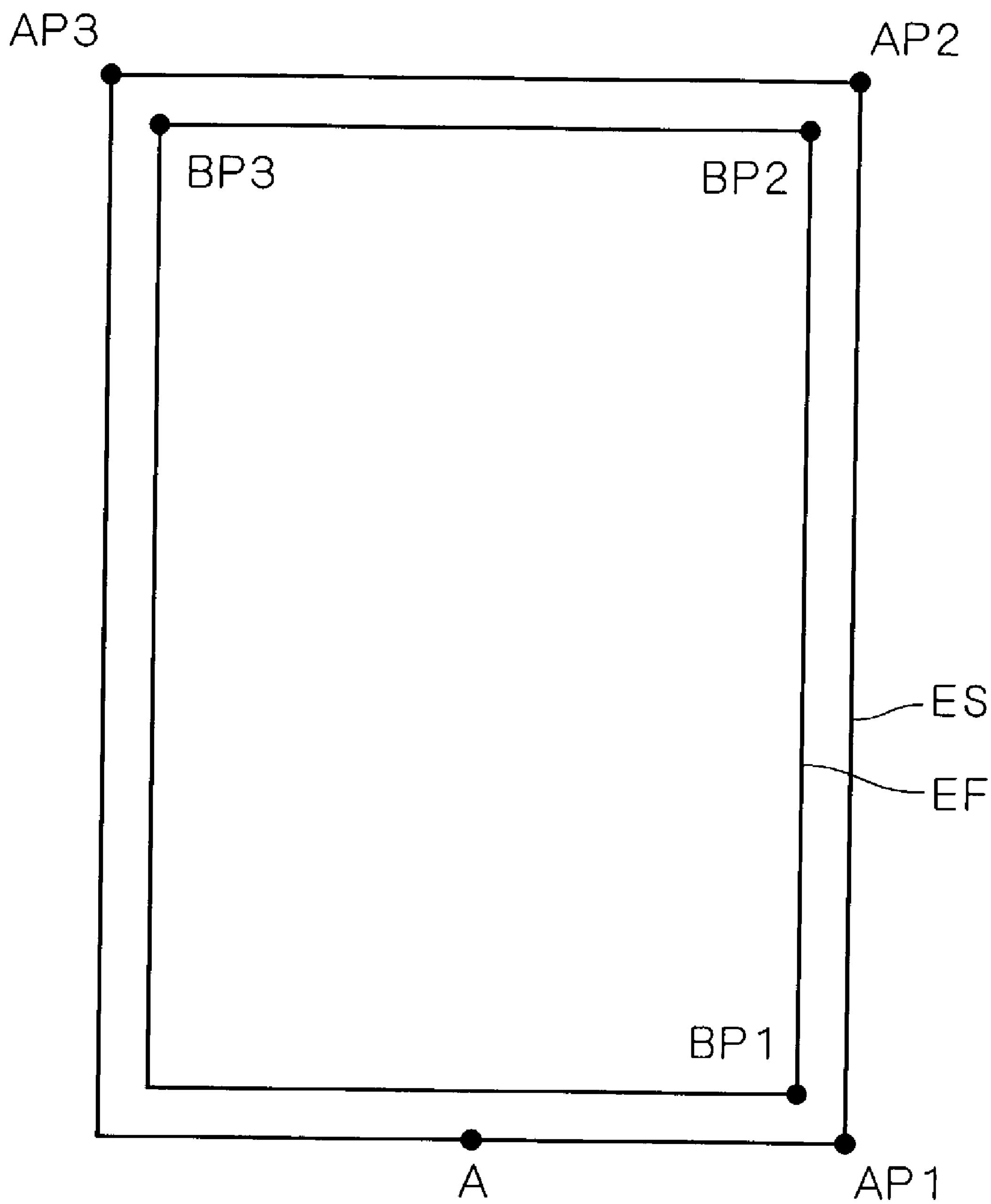

F I G . 2 8
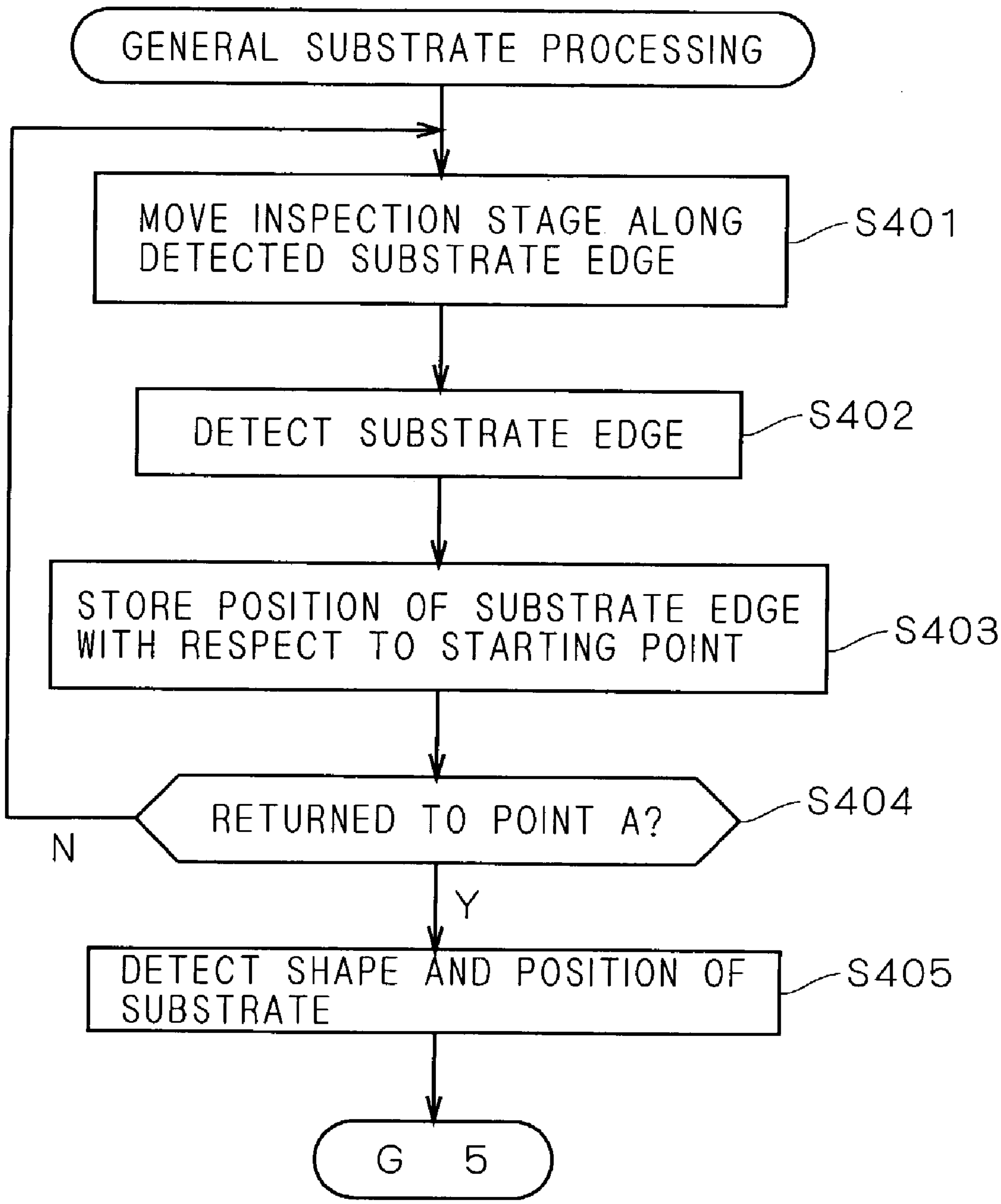

F I G . 2 9
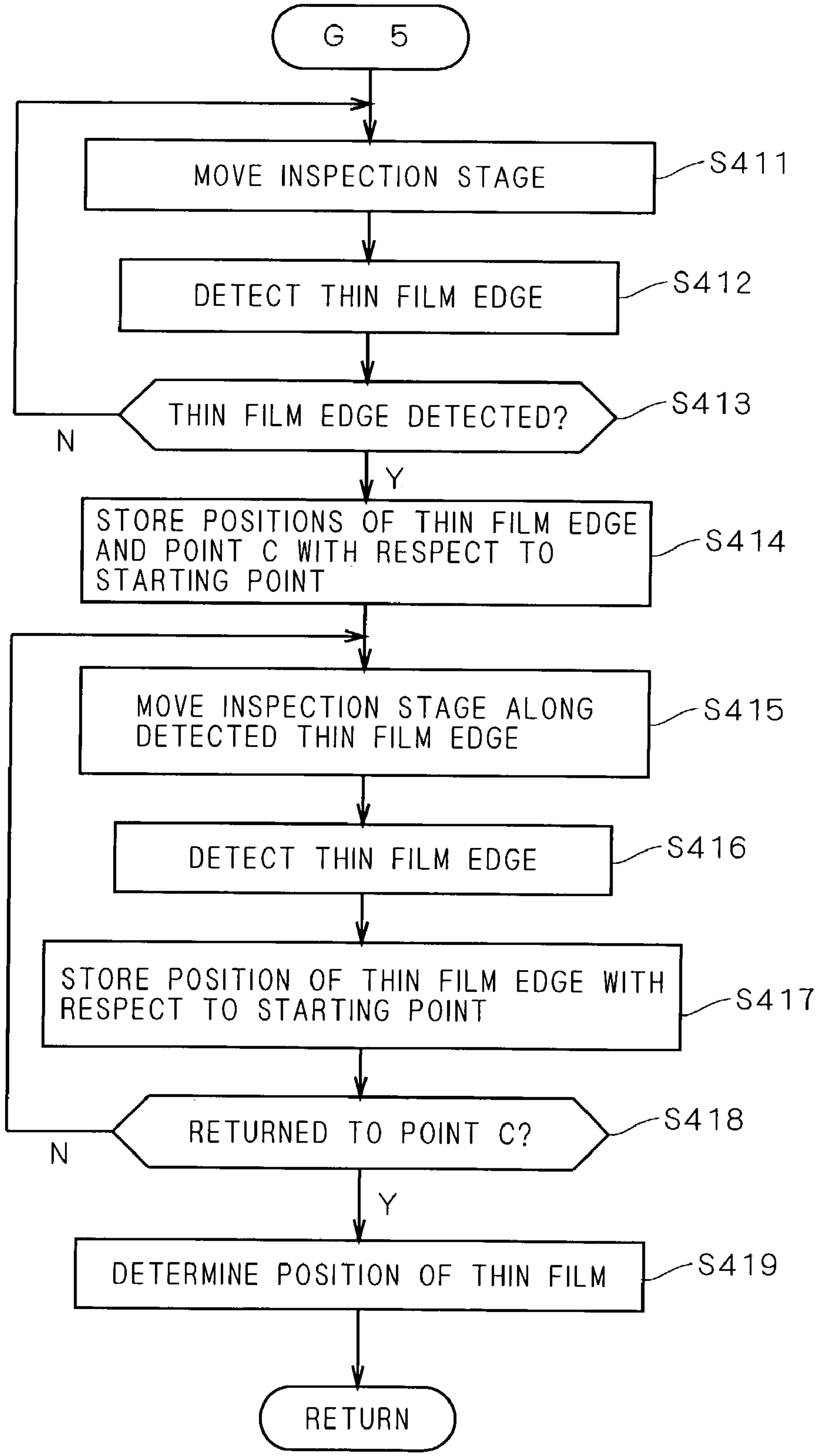

F I G . 3 0
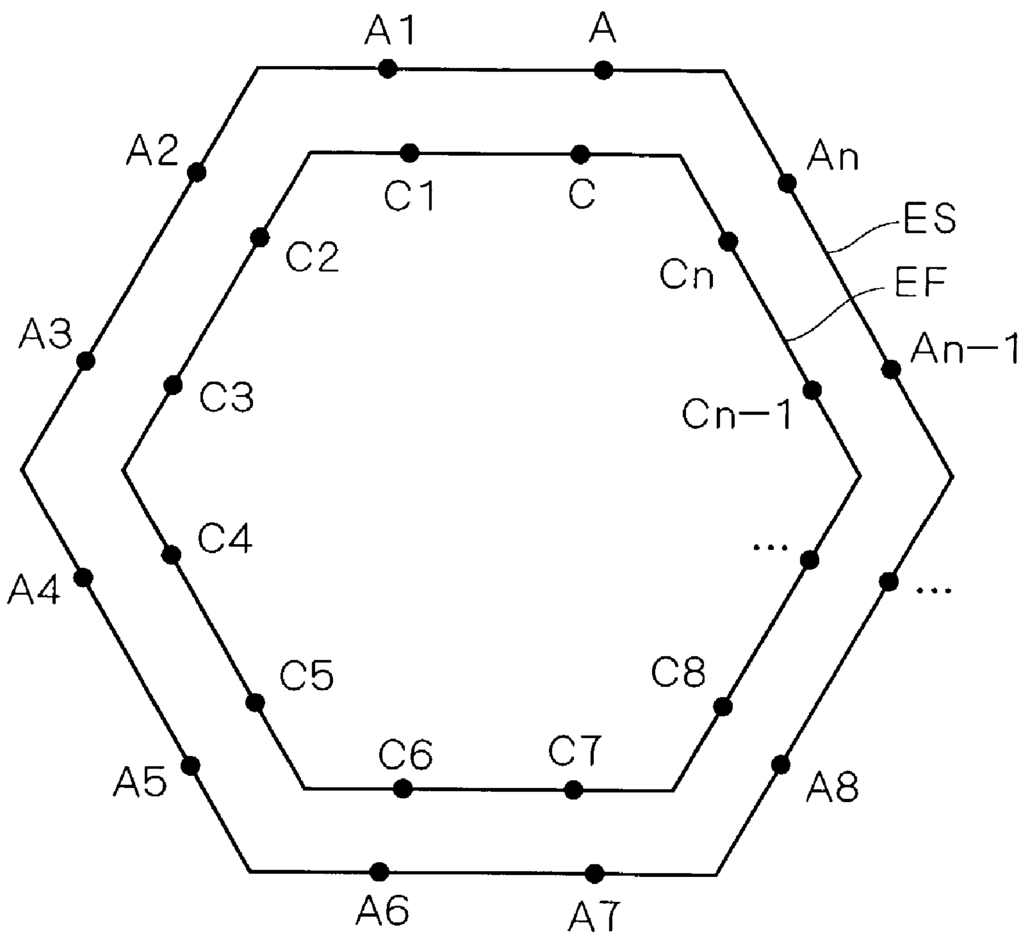

F I G . 3 3
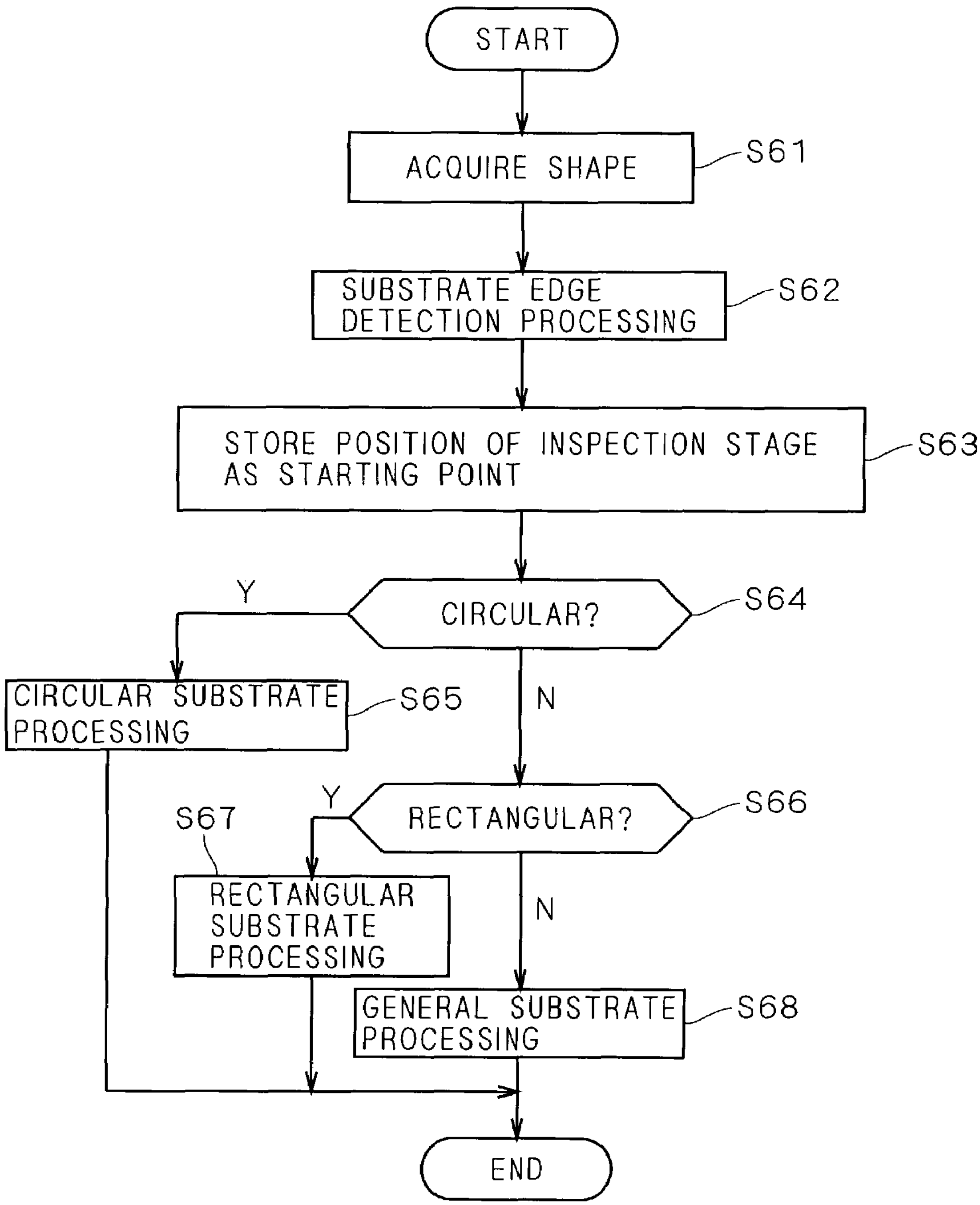

F I G . 3 8
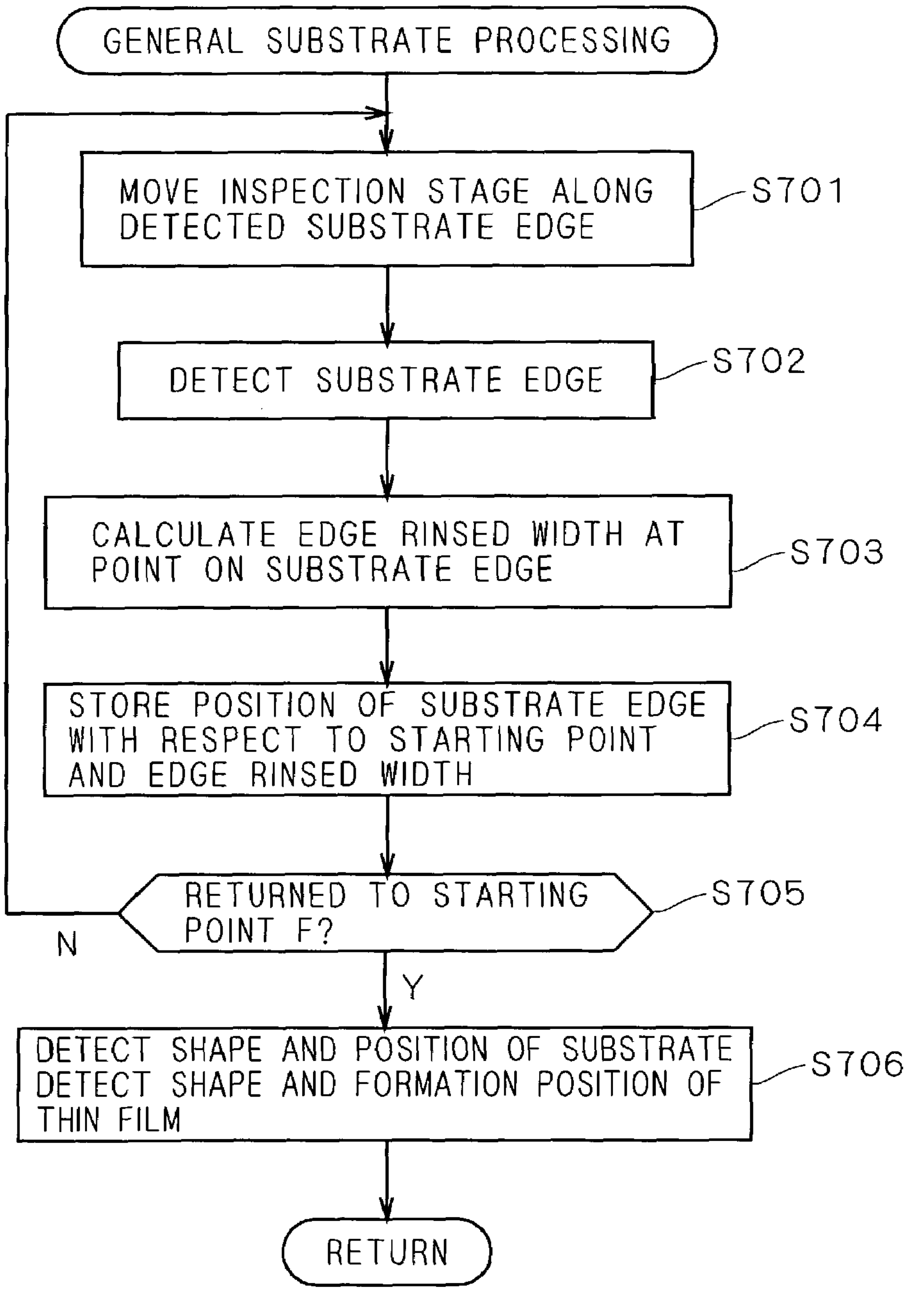

MEASURING APPARATUS

BACKGROUND OF THE INVENTION

1. Field of the Invention

The present invention relates to an apparatus for measuring a thin film such as a resist thin film formed on a substrate such as a semiconductor wafer or a substrate for a flat panel display.

2. Description of the Background Art

Before a circuit pattern or the like is formed on a substrate in a step of manufacturing a substantially circular semiconductor wafer or a rectangular glass substrate, the substrate is coated with a photosensitive resist solution by the so-called spin coating. In this coating processing, the resist solution is discharged toward the substrate for forming a resist thin film on the surface of the substrate. In this method of forming the resist thin film by spin coating, part of the resist thin film is formed on an edge such as the upper surface, the side surface or the lower surface of an end of the substrate. When the part of the resist thin film formed on the edge of the substrate drops in a substrate processing apparatus during transportation or processing of the substrate, it follows that subsequent processing is badly influenced by particles or the like. In order to prevent this, edge cleaning processing (edge rinsing through an EBR (edge bead remover)) is generally performed for cleaning/removing the unnecessary part of the resist thin film formed on the edge of the substrate after the spin coating.

An apparatus executing the aforementioned edge cleaning processing on a substantially circular substrate such as a semiconductor wafer or a rectangular substrate is known as this type of apparatus.

When the resist solution is of a positive type, edge exposure may be employed as a method of removing the unnecessary part of the resist thin film formed on the edge of the substrate. In this edge exposure, the unnecessary part of the resist thin film formed on the edge of the substrate is exposed and thereafter removed by development processing.

In general, an operator visually inspects the state of removal of the unnecessary part of the resist thin film resulting from the aforementioned edge cleaning processing or edge exposure by microscopically observing the edge of the substrate thereby determining correctness thereof or the like.

In the aforementioned visual inspection by the operator, the results of inspection vary with the degree of experience or skillfulness of the operator, leading to a problem of incorrect inspection.

SUMMARY OF THE INVENTION

The present invention is directed to an apparatus for measuring a thin film such as a resist film formed on a substrate such as a semiconductor wafer or a substrate for a flat panel display.

According to the present invention, a measuring apparatus comprises a first detection element detecting an end position of a substrate, a second detection element detecting an end position of a thin film formed on a region, smaller than the main surface of the substrate, of the substrate, and a calculation element calculating the width between an end of the thin film and an end of the substrate on the basis of the end position of the substrate detected by the first detection element and the end position of the thin film detected by the second detection element.

Thus, the width can be automatically measured without through an operator.

According to a preferred embodiment of the present invention, the first detection element comprises an imaging part imaging the end of the substrate as first image data thereby detecting the end position of the substrate on the basis of the first image data.

Preferably, an imaging region for the first image data includes a region including the end of the thin film, and the second detection element detects the end position of the thin film on the basis of the first image data.

The present invention is also directed to a measuring apparatus comprising a first detection element detecting a plurality of end positions of a substrate for obtaining the position of the substrate from the results of this detection, a second detection element detecting a plurality of end positions of a thin film formed on a region, smaller than the surface of the substrate, of the substrate for obtaining the position of the thin film from the results of this detection and a comparison element comparing the position of the substrate obtained by the first detection element and the position of the thin film obtained by the second detection element with each other, thereby automatically measuring the position of formation of the thin film with respect to the substrate.

Accordingly, a first object of the present invention is to provide a measuring apparatus capable of measuring the width between an end of a thin film formed on a substrate and an end of the substrate.

A second object of the present invention is to provide a measuring apparatus capable of correctly measuring the position of formation of a thin film formed on a substrate with respect to the substrate.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 1 illustrates the structure of a width measuring apparatus according to a first preferred embodiment of the present invention;

FIG. 2 illustrates the functional structure of a calculation part of the width measuring apparatus according to the first preferred embodiment with flows of signals;

FIG. 3 illustrates the state of illumination light applied to a trimmed edge of a substrate;

FIG. 4 illustrates an exemplary image obtained by imaging a portion around an edge of a substrate with light applied to a first main surface of the substrate;

FIG. 5 illustrates a portion related to an inspection stage in FIG. 1 in an enlarged manner;

FIG. 6 illustrates exemplary substrate end image data acquired by the width measuring apparatus according to the first preferred embodiment;

FIGS. 9 and 10 are flow charts showing operations of the width measuring apparatus according to the first preferred embodiment;

FIG. 12 illustrates the functional structure of a calculation part of the width measuring apparatus according to the second preferred embodiment with flows of signals;

FIG. 13 is a diagram illustrating a principle of calculation of positional relation between separately imaged regions;

FIG. 14 is a flow chart showing operations of the width measuring apparatus according to the second preferred embodiment;

FIG. 15 is a flow chart showing a procedure of measuring an edge rising width of a substrate in the width measuring apparatus according to the second preferred embodiment;

FIG. 16 illustrates a portion related to an inspection stage in an enlarged manner in the structure of a width measuring apparatus according to a third preferred embodiment of the present invention;

FIG. 17 illustrates exemplary substrate edge image data obtained by imaging a portion around a substrate edge with an imaging system of the width measuring apparatus according to the third preferred embodiment:

FIG. 18 illustrates the structure of a thin film position measuring apparatus according to a fourth preferred embodiment of the present invention;

FIG. 19 illustrates the functional structure of a calculation part of the thin film position measuring apparatus according to the fourth preferred embodiment with flows of signals;

FIG. 20 is a flow chart showing operations of the thin film position measuring apparatus according to the fourth preferred embodiment;

FIG. 21 is a flow chart showing substrate edge detection processing in detail;

FIG. 27 illustrates exemplary detection corresponding to the rectangular substrate processing in the fourth preferred embodiment;

FIGS. 28 and 29 are flow charts showing general substrate processing in the fourth preferred embodiment in detail;

FIG. 30 illustrates exemplary detection corresponding to the general substrate processing in the fourth preferred embodiment;

FIG. 33 is a flow chart showing operations of the thin film position measuring apparatus according to the fifth preferred embodiment;

FIG. 38 is a flow chart showing general substrate processing in the fifth preferred embodiment in detail;

DESCRIPTION OF THE PREFERRED EMBODIMENTS

<1. First Preferred Embodiment>

Figure 7:
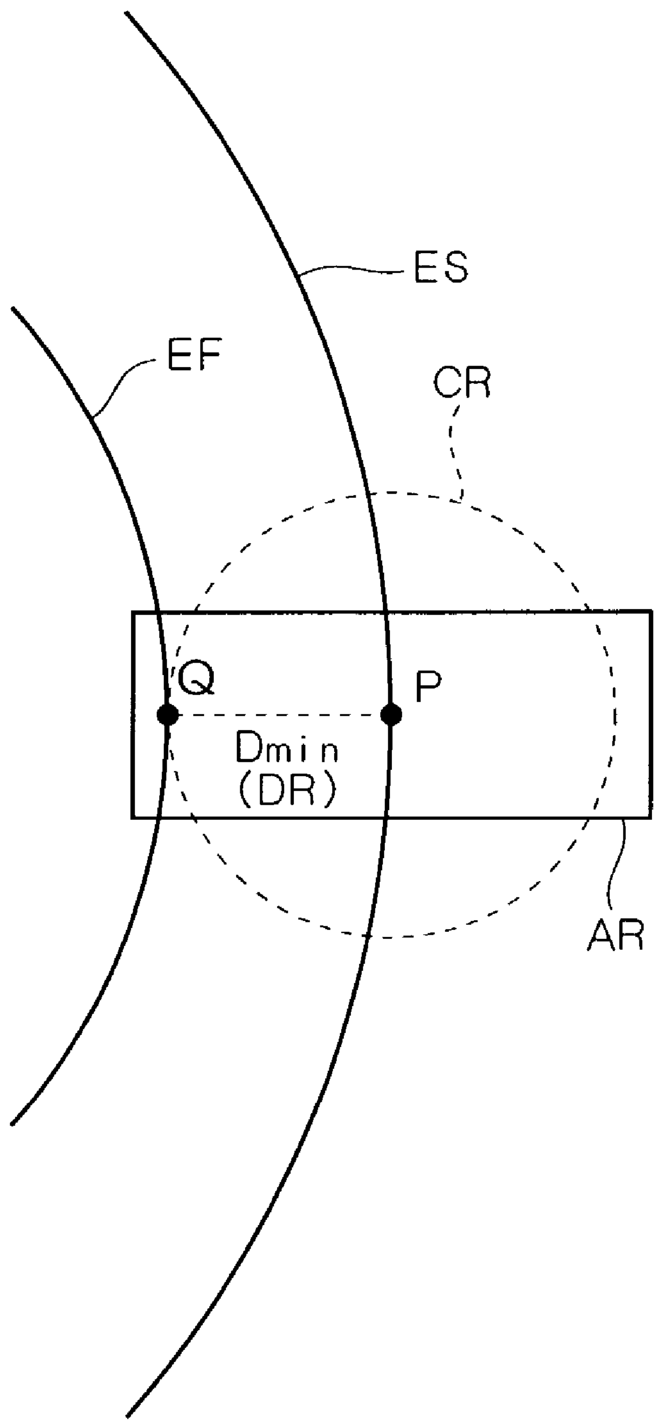
FIGS. 7 and 8 illustrate a method of calculating an edge rinsed width.

FIG. 1 illustrates the structure of a width measuring apparatus 1 according to a first preferred embodiment of the present invention. The width measuring apparatus 1, directed to a substrate 91 coated with a resist solution or the like by spin coating and thereafter subjected to edge cleaning processing (edge rinsing processing), comprises an illumination optical system 20, an image formation optical system 30, an inspection stage 40, a control unit 50, an imaging system 60 and a spectroscopic unit 70.

The width measuring apparatus 1 has a function of measuring the width (hereinafter referred to as "edge rinsed width") between an end of a resist thin film (hereinafter simply referred to as "thin film") formed on a substrate 91 by spin coating and edge rinsing processing or the like and an end of the substrate 91.

The inspection stage 40 having a reflecting mirror 41 on its outer periphery receives the substrate 91 formed with the thin film and moves in directions X and Y in response to a control signal from the control unit 50 (mainly a calculation part 51). The inspection stage 40 moves in the directions X and Y thereby relatively moving the imaging system 60 fixed in the width measuring apparatus 1 and the substrate 91. Therefore, the inspection stage 40 can move an arbitrary region of the surface of the substrate 91 to a measuring position. A spin motor (not shown) may rotate/drive the inspection stage 40.

The illumination optical system 20 is provided with a light source 21 consisting of a halogen lamp, for emitting illumination light of a constant observation wave range (e.g., 400 nm to 800 nm). The light emitted from the light source 21 enters the image formation optical system 30 through a condenser lens 22, a field stop 23 and another condenser lens 24.

The image formation optical system 30 consists of an objective lens 31, a beam splitter 32 and a tube lens 33, for reflecting the illumination light received from the light source 21 and applying the same to a prescribed measuring position through the objective lens 31. A light component reflected by the substrate 91 located on the measuring position, including a light component reflected by the thin film formed on the substrate 91 in more detail, and a light component reflected by the reflecting mirror 41 are condensed on a prescribed position of an optical axis through the objective lens 31, the beam splitter 32 and the tube lens 33.

A pinhole mirror 42 having a pinhole on its central portion is arranged in the vicinity of the condensing position, so that a light component, included in the condensed light, passing through the pinhole enters the spectroscopic unit 70. A light component reflected by the pinhole mirror 42 is further reflected by a mirror 43, to enter the imaging system 60.

The control unit 50 comprises the calculation part 51 performing arithmetic processing, a storage part 52 storing various data, an operation part 53 receiving instructions from an operator and a display part 54 displaying various data as shown in FIG. 1, and the calculation part 51 is connected to the storage part 52, the operation part 53 and the display part 54 through an input/output port (not shown). The calculation part 51 transfers signals between the same and photodetectors 62 and 72 through the input/output port.

More specifically, the storage part 52 is formed by a magnetic disk, a reader for reading data from a storage medium, a ROM, a RAM temporarily storing data and the like. The operation part 53 is formed by a keyboard, a mouse, various buttons and the like. The display part 54 can be formed by a liquid crystal display, a display lamp and the like.

The imaging system 60 detects the light reflected by the mirror 43 by the photodetector 62 such as a CCD through an image formation lens 61 and supplies the same to the control unit 50 as a signal, thereby imaging an object as an image. The photodetector 62, having an imaging region AR (shown in FIG. 7) smaller than the area of the main surface of the substrate 91 and wider than the edge rinsed width, can simultaneously image a substrate edge and a thin film edge.

The spectroscopic unit 70 is formed by a concave diffraction grating 71 separating incident light into light components and the photodetector 72 detecting the spectrum of light diffracted by the concave diffraction grating 71. The photodetector 72 is formed by a photodiode array or a CCD, for example. The concave diffraction grating 71 separates light fetched in the spectroscopic unit 70 so that the photodetector 72 supplies a spectral signal corresponding to the energy of each spectrum to the control unit 50.

FIG. 2 illustrates the functional structure of the calculation part 51 in the width measuring apparatus 1 according to the first preferred embodiment. In the structure shown in FIG. 2, an image processing part 510, a determination part 511, a film thickness measuring part 512, a thin film end position detection part 513 and a width measuring part 514 are functions implemented by the calculation part 51 operating according to a program stored in the storage part 51. These functions are not restrictively implemented by software but all or partial functions of the image processing part 510 may be implemented by hardware with a dedicated logic circuit, for example.

The image processing part 510 creates substrate end image data (first image data) by imaging the substrate edge on the measuring position on the basis of the signal from the photodetector 62. The image processing part 510 also performs general edge detection processing on the substrate end image data thereby detecting the position of the substrate edge and transferring the same to the width measuring part 514. That is, the image processing part 510 mainly corresponds to the first detection element in the present invention. The image processing part 510 employs a method of detecting boundary positional information from contrast (difference in concentration, difference in color or the like), for example, for the edge detection processing.

FIG. 3 illustrates the state of the illumination light applied to a trimmed edge of the substrate 91. FIG. 4 illustrates an exemplary image obtained by imaging a portion around a substrate edge ES with light applied to a surface (hereinafter referred to as "first main surface") of the substrate 91 formed with the thin film.

In general, an end of the substrate 91 processed by a substrate processing apparatus or the like is trimmed as shown in FIG. 1 and the light applied to the first main surface thereof is scattered on the trimmed portion (curved portion of the substrate 91 shown in FIG. 3), not to enter the objective lens 31. Therefore, the substrate 91 cannot be correctly distinguished from the outer side thereof from the image as shown in FIG. 4 but the substrate edge ES cannot be detected.

FIG. 5 illustrates a portion related to the inspection stage 40 shown in FIG. 1 in an enlarged manner. In the width measuring apparatus 1, the reflecting mirror 41 reflects a light component, included in the light applied from the side of the first main surface, passing through the outer side of the substrate 91 toward the objective lens 31. In other words, the illumination light reflected by the reflecting mirror 41 illuminates an end of the substrate 91 from a surface (hereinafter referred to as "second main surface") opposite to the first main surface. That is, the reflecting mirror 41 mainly corresponds to the illumination part in the present invention.

FIG. 6 illustrates exemplary substrate end image data acquired by the width measuring apparatus 1. As shown in FIG. 6, the first main surface and the outer side of the substrate 91 are brightly imaged since the illumination light is reflected to enter the objective lens 31, while the trimmed portion of the substrate 91 scattering the illumination light is imaged in the form of a dark strip. When the edge detection processing is performed on the basis of such substrate end image data, two edges ER and ES are detected.

The width measuring apparatus 1 can determine the bright portion present in a direction −Y in FIG. 6 as the first main surface of the substrate 91 on the basis of positional information of the objective lens 31 with respect to the substrate 91. Similarly, the width measuring apparatus 1 can determine the bright portion present in a direction +Y in FIG. 6 as a region outside the substrate 91. Therefore, the width measuring apparatus 1 can determine the boundary between the substrate 91 and the outside region as the substrate edge ES in the edges ER and ES shown in FIG. 6.

The substrate edge ES, which is a closed curve as a whole, is detected as a mere partial curve or a straight line as shown in FIG. 6 in the imaging region AR of the imaging system 60 according to the first preferred embodiment. When the substrate end is trimmed, an image focused on the substrate edge ES can be acquired by automatically focusing the imaging system 60 on the first main surface of the substrate 91 and further displacing the focus by a distance half the thickness, assumed to be previously input, of the substrate 91. In this case, the inspection stage 40 may be moved in a Z-axis direction for controlling the focus.

Referring again to FIG. 2, the determination part 511 selects a method of detecting the thin film edge position on the basis of set information previously input by the operator. The determination part 511 selects either "film thickness utilization" detecting the thin film edge position from the film thickness or "image utilization" detecting the same from the acquired substrate end image data as the detection method and supplies instructions to the film thickness measuring part 512 and the thin film end position detection part 513. The operator previously determines and inputs the set information for deciding which method is to be selected mainly on the basis of the material for the thin film.

The film thickness measuring part 512 obtains the thickness of the thin film on the basis of the spectral signal from the photodetector 72. That is, the spectroscopic unit 70 and the film thickness measuring part 512 mainly correspond to the film thickness measuring element in the present invention. As to an arithmetic method of obtaining the thickness of the thin film, a method employing spectral reflectance measurement is known, for example. This is a method of applying illumination light to a thin film formed on a substrate, observing interference between a light component reflected by the surface of the thin film and a light component transmitted through the thin film and reflected on the surface of the substrate and calculating the difference between the optical paths of the two light components thereby obtaining the thickness of the thin film. In the first preferred embodiment, it is assumed that a region (hereinafter referred to as "film thickness measuring region") where the spectroscopic unit 70 and the film thickness measuring part 512 can measure the thickness of the thin film without moving the inspection stage 40 is identical to the imaging region AR of the imaging system 60 and positions in the film thickness measuring region and the imaging region AR can be associated with each other in one-to-one-correspondence.

The thin film end position detection part 513 detects the thin film edge position and transfers the same to the width measuring part 514 on the basis of the thickness obtained by the film thickness measuring part 512. The film thickness, measured as a substantially constant positive value on the position where the thin film is present, substantially reaches "0" on a position where part of the thin film is removed by edge rinsing. Therefore, the thin film end position detection part 513 detects the boundary where the film thickness changes to "0" from distribution of thicknesses of the thin film.

The thin film end position detection part 513 also has a function of detecting the thin film edge position on the basis of the substrate end image data by a method similar to that employed by the image processing part 510 for detecting the substrate end position. That is, the thin film end position detection part 513 mainly corresponds to the second detection element in the present invention.

The width measuring part 514 obtains the edge rinsed width between the substrate edge and the thin film edge on the basis of the substrate edge position and the thin film edge position. That is, the width measuring part 514 mainly corresponds to the calculation element in the present invention.

Figure 8:
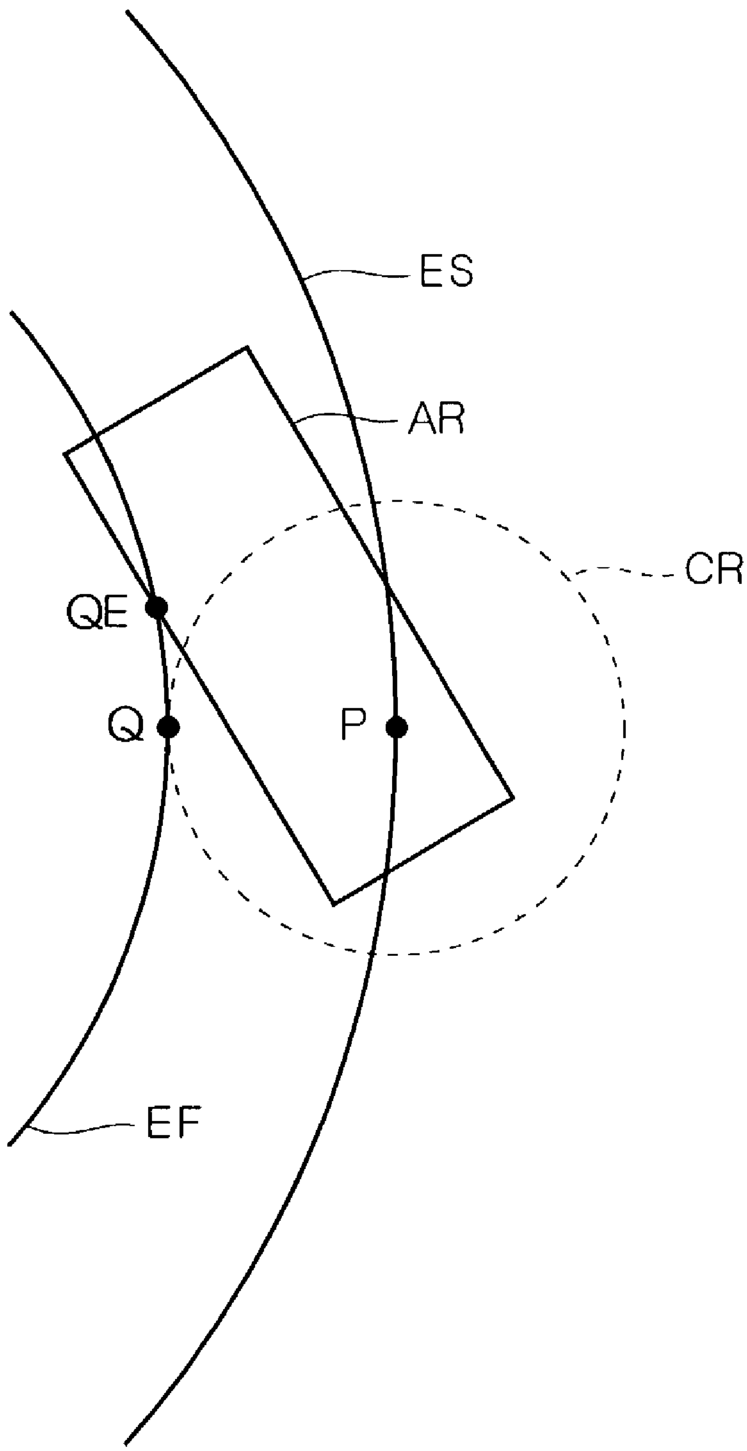

As shown in FIG. 7, the width measuring part 514 calculates the minimum distance Dmin between a midpoint (hereinafter referred to as "point P") on the detected substrate edge ES and the thin film edge EF as an edge rinsed width DR. In this case, the width measuring part 514 may obtain the radius of a circle CR having the minimum radius (i.e., a circle in contact with the thin film edge EF) intersecting with the detected thin film edge EF among circles about the point P. Referring to FIG. 7, the distance between the thin film edge EF and the point P is at the minimum on a point Q (contact point with the circle CR in the embodiment). The edge rinsed width DR at the midpoint P of the detected substrate edge ES is calculated in order to readily detect the point Q in the film thickness measuring region and the imaging region AR by selecting a point imaged closest to the center in the imaging region AR, and the point P may intrinsically be an arbitrary point on the substrate edge ES. When the intersection QE between the circle CR having the minimum radius and the thin film edge EF is detected on an end of the film thickness measuring region or the imaging region AR (see FIG. 8), it is preferable not to regard the distance between the points QE and P as the edge rinsed width DR but to determine that the point Q exhibiting the minimum distance between the point P and the thin film edge EF is present on the thin film edge EF present outside this region and move the inspection stage 40.

Figure 10:
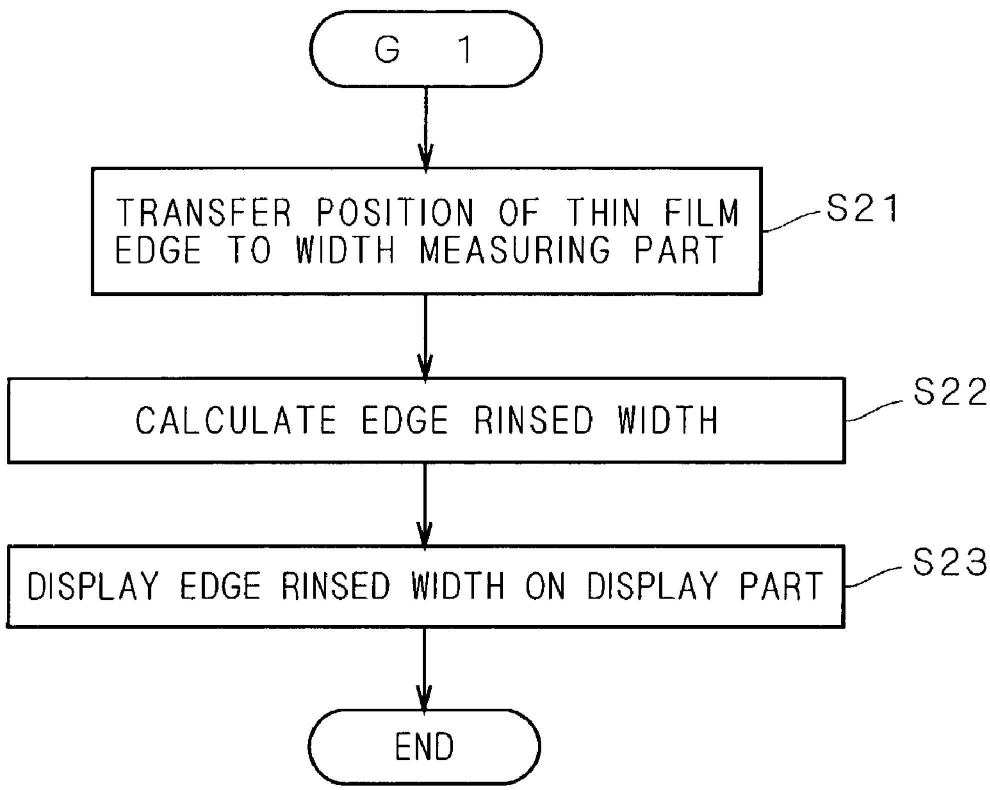

FIGS. 9 and 10 are flow charts showing a procedure of measuring the edge rinsed width DR of the substrate 91 in the width measuring apparatus 1 according to the first preferred embodiment.

First, a transport mechanism (not shown) transports the substrate 91 to the inspection stage 40 in the width measuring apparatus 1 (step S11). Then, the inspection stage 40 receiving the substrate 91 thereon moves the substrate 91 so that the imaging system 60 images the substrate 91 (step S12).

Then, the image processing part 510 creates substrate end image data and performs edge detection processing for detecting whether or not the substrate edge ES has been detectable (step S13). If the substrate edge ES is undetectable, the process returns to the processing at the step S12 for further moving the inspection stage 40 and repeating imaging.

When detecting the substrate edge ES, the image processing part 510 transfers the position of the substrate edge ES on the imaging region AR to the width measuring part 514 (step S14).

Then, the thin film end position detection part 513 detects the thin film edge EF (step S15). In the case of a resist thin film, the thin film end position detection part 513 detects the thin film edge EF by either one of the aforementioned film thickness utilization and the image utilization.

Thus, the width measuring apparatus 1 can readily detect the thin film edge position on the basis of the thickness of the thin film or the image data. If the thin film edge EF is undetectable at the step S15, the width measuring apparatus 1 may regard the thin film edge EF as nonpresent in the thickness measuring region and the imaging region AR, to return to the step S12. In this case, the control unit 50 may move the inspection stage 40 through the result of detection of the substrate edge position for locating the detected substrate edge ES at the center of the imaging region AR, for example.

When detecting the thin film edge EF, the thin film end position detection part 513 transfers the position of the thin film edge EF to the width measuring part 514 (step S21). The width measuring part 514 calculates the distance between the substrate edge ES and the thin film edge EF and calculates the edge rinsed width DR (step S22).

Upon calculation of the edge rinsed width DR, the width measuring apparatus 1 displays the edge rinsed width DR on the display part 54 (step S23), so that the operator can confirm the width with removal of the part of the thin film formed on the substrate 91.

Thus, the width measuring apparatus 1 can detect the substrate end position and the thin film end position for automatically obtaining the width between the end of the thin film formed on the substrate 91 and the end of the substrate 91 without through the operator. When previously deciding a prescribed value as a specified width, therefore, it is possible to correctly inspect whether or not part of the thin film formed on the substrate 91 is correctly removed by edge rinsing with no influence by the degree of experience or skillfulness of the operator by numerically comparing the actually measured value of the edge rinsed width DR and the specified width.

The imaging system 60 capable of imaging a relatively wide range is employed for simultaneously imaging the substrate edge ES and the thin film edge EF and calculating the edge rinsed width DR, whereby control is so simplified that the processing time can be reduced by saving the arithmetic quantity or the like.

<2. Second Preferred Embodiment>

While the width measuring apparatus 1 according to the first preferred embodiment simultaneously images the substrate edge ES and the thin film edge EF with the imaging system 60 capable of imaging a relatively wide range, the substrate edge ES and the thin film edge EF may alternatively be separately imaged.

Figure 11:
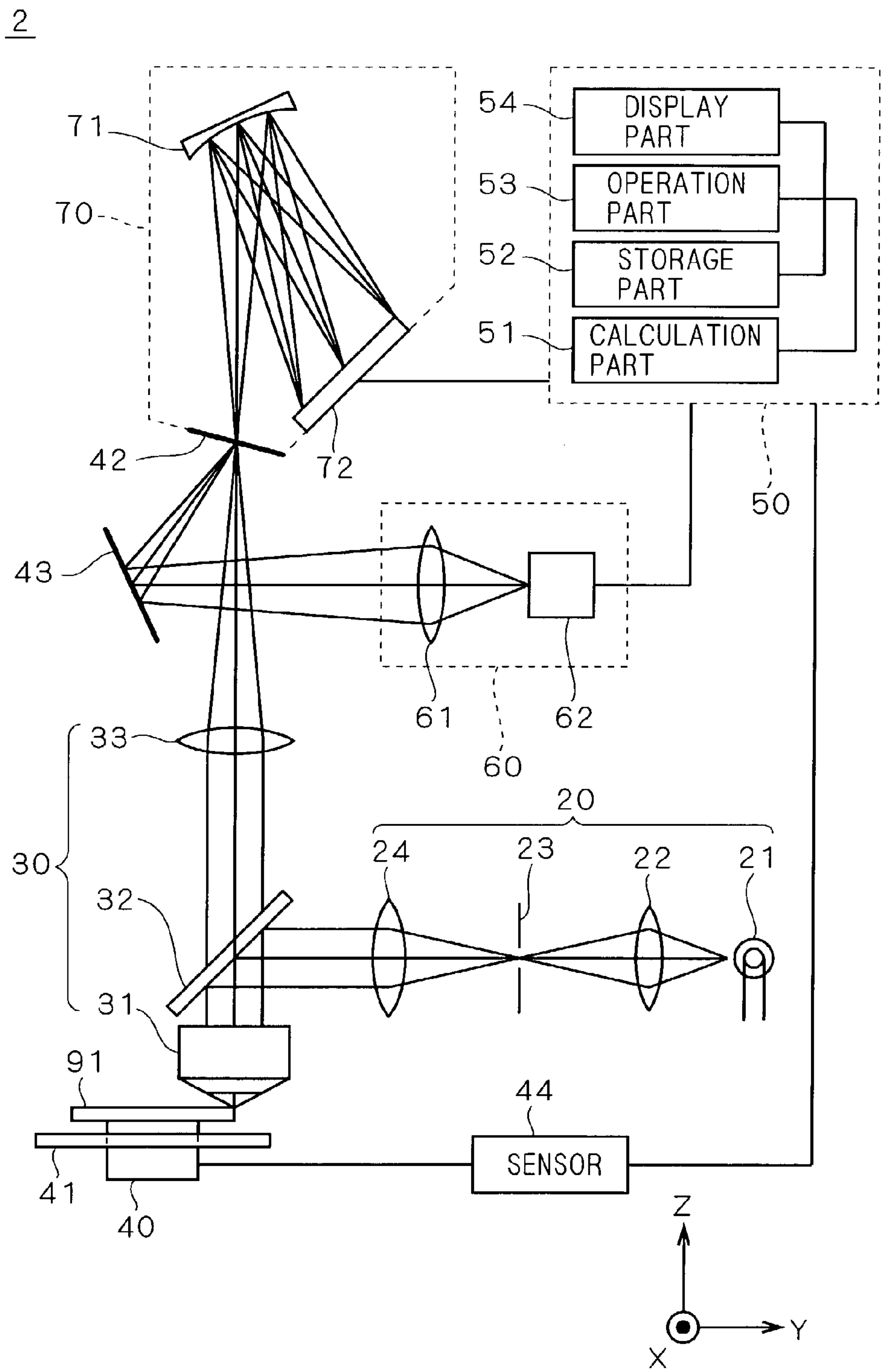
FIG. 11 illustrates the structure of a width measuring apparatus according to a second preferred embodiment of the present invention.

FIG. 11 illustrates the structure of a width measuring apparatus 2 according to a second preferred embodiment of the present invention structured on the basis of this principle. Structural parts having functions similar to those of the width measuring apparatus 1 according to the first preferred embodiment are denoted by the same reference numerals, and redundant description is properly omitted.

The width measuring apparatus 2 has a sensor 44 having a function of detecting positions of an inspection stage 40 along an X-axis and a Y-axis and supplying the same to a control unit 50 as signals.

An imaging system 60 of the width measuring apparatus 2 has an imaging region AR narrower than an edge rinsed width DR, for separately imaging a substrate edge ES and a thin film edge EF. It is assumed that a film thickness measuring region is identical to the imaging region AR and positions in the thickness measuring region and the imaging region AR can be associated with each other in one-to-one correspondence also in the width measuring apparatus 2.

FIG. 12 illustrates the functional structure of a calculation part 51 in the second preferred embodiment. In the structure shown in FIG. 12, a movement detection part 515 is a function implemented by the calculation part 51 operating according to a program stored in a storage part 52.

An image processing part 510 creates not only substrate end image data similarly to that in the first preferred embodiment but also thin film end image data (second image data) obtained by imaging an end of a thin film. While the width measuring apparatus 1 according to the first preferred embodiment detects the thin film edge position on the basis of the substrate end image data obtained by simultaneously imaging the substrate edge ES and the thin film edge EF, the image processing part 510 of the width measuring apparatus 2 according to the second preferred embodiment detects a thin film edge position on the basis of the thin film end image data.

The movement detection part 515 acquires positions of the inspection stage 40 at the times of imaging the substrate end image data and the thin film end image data respectively from the sensor 44 for detecting the distance and the direction of movement of the inspection stage 40 from the position imaging the substrate end image data to that imaging the thin film end image data.

FIG. 13 schematically illustrates the principle of this detection by relatively expressing a movement vector −V1 of the imaging region AR with respect to a movement vector V1 of a substrate 91 equivalent to a movement vector of the inspection stage 40. The width measuring apparatus 2 combines positional information of a substrate edge ES in an imaging region AR1 and positional information of a thin film edge EF in an imaging region AR2 with each other through the movement vector V1 or −V1, thereby calculating the edge rinsed width DR. That is, the sensor 44 and the movement detection part 515 correspond to the movement vector detection element in the present invention.

FIGS. 14 and 15 are flow charts showing a procedure of measuring the edge rinsed width DR for the substrate 91 in the width measuring apparatus 2 according to the second preferred embodiment.

First, a transport mechanism transports the substrate 91 to the inspection stage 40 so that the image processing part 510 detects the substrate edge ES and transfers the substrate edge position to a width measuring part 514 in the width measuring apparatus 2, similarly to the steps S11 to S14 in the first preferred embodiment (steps S31 to S34).

Upon detection of the substrate edge position, the movement detection part 515 detects the position of the inspection stage 40 detecting the substrate edge position on the basis of the signal from the sensor 44 (step S35), so that the inspection stage 40 moves the substrate 91 (step S41). It is assumed that the inspection stage 40 is controlled to move along a portion, present inside the substrate 91, of a normal L with respect to the detected substrate edge ES. This is because the width measuring part 514 requires the position of a point Q for obtaining the edge rinsed width DR and a control unit 50 controls the inspection stage 40 in the aforementioned manner so that the point Q can be efficiently detected.

The width measuring apparatus 2 executes thin film edge detection processing (step S42), determines whether or not the thin film edge EF has been detectable (step S43), regards that the measuring range includes no thin film edge EF if the thin film edge EF is undetectable, and returns to the step S41 to repeat the processing in order to further move the substrate 91. The thin film edge detection processing is similar to that at the step S15 in the first preferred embodiment.

When the thin film edge EF is detectable, a thin film end position detection part 513 transfers the thin film edge position to the width measuring part 514 (step S44). Further, the movement detection part 515 detects the position of the inspection stage 40 (step S45) and detects the distance and the direction (corresponding to the movement vector of the inspection stage 40) of movement of the inspection stage 40 from the position detecting the substrate edge ES detected at the step S35 to the position detecting the thin film edge EF for transferring the same to the width measuring part 514 (step S46).

The width measuring part 514 calculates the edge rinsed width DR on the basis of the distance and the direction of movement of the inspection stage 40, the substrate edge position and the thin film edge position (step S47) and displays the edge rinsed width DR on a display part 54 (step S48).

Thus, the width measuring apparatus 2 according to the second preferred embodiment can also attain an effect similar to that of the first preferred embodiment. Further, the width measuring apparatus 2, capable of measuring the edge rinsed width DR by separately detecting the substrate edge ES and the thin film edge EF also when the imaging system 60 has the narrow imaging region AR, can be scaled down by forming the imaging system 60 by a miniature one having the narrow imaging region AR. Alternatively, measurement accuracy can be improved by employing an image formation optical system 30 having a higher magnification while consequently narrowing the imaging region AR.

<3. Third Preferred Embodiment>

While the width measuring apparatus 1 according to the aforementioned first preferred embodiment employs the method of illuminating the substrate 91 from the side of the second main surface by reflecting the illumination light applied to the side of the first main surface with the reflecting mirror 41 provided on the side of the second main surface for detecting the substrate edge ES, another light source may alternatively be provided on the side of the second main surface.

FIG. 16 illustrates a portion related to an inspection stage 40 in a width measuring apparatus 3 according to a third preferred embodiment of the present invention structured on the basis of this principle. Structural parts having functions similar to those of the width measuring apparatus 1 according to the first preferred embodiment are denoted by the same reference numerals, and redundant description is properly omitted.

The width measuring apparatus 3 comprises a light source 25 on the side of a second main surface of a substrate 91 in place of the reflecting mirror 41 employed in the first preferred embodiment, for applying illumination light emitted from the light source 25 to a prescribed position on an end of the substrate 91 from the side of the second main surface thereof. According to this structure, only a light component not blocked by the substrate 91 enters an objective lens 31 in the illumination light emitted from the light source 25.

FIG. 17 illustrates exemplary substrate end image data obtained by imaging a portion around a substrate edge ES by an imaging system 60 of the width measuring apparatus 3. As shown in FIG. 17, the illumination light emitted from the light source 25 is so blocked that a region provided with the substrate 91 is darkly imaged and only the outer side of the substrate 91 is brightly imaged in an imaging region AR.

Thus, the width measuring apparatus 3 according to the third preferred embodiment can also attain an effect similar to that of the aforementioned first preferred embodiment. Further, the light source 25 is provided on the side of the second main surface of the substrate 91 so that the end of the substrate 91 can be readily detected also when the same is trimmed.

When a light source 21 and the light source 25 are formed by those emitting light components having different frequencies respectively, the light components emitted from the light sources 21 and 25 can be distinguished from each other at need. Alternatively, optical filters transmitting only light components of specific frequencies may be set in front of the light sources 21 and 25 respectively thereby distinguishing the light components emitted from the same.

<4. Fourth Preferred Embodiment>

Each of the aforementioned first and second embodiments inspects whether or not edge rinsing processing is correctly performed by measuring and displaying the edge rinsed width DR. In order to determine correctness of the edge rinsing processing, however, not only the edge rinsed width DR but also the position of the thin film formed on the substrate 91 comes into question.

FIG. 18 illustrates the structure of a thin film position measuring apparatus 4 according to a fourth preferred embodiment of the present invention. The thin film position measuring apparatus 4, similar in structure to the width measuring apparatus 2 (FIG. 11) according to the second preferred embodiment, measures the position of formation (hereinafter simply referred to as "formation position") of a thin film formed on a substrate 91.

FIG. 19 illustrates the functional structure of a calculation part 51 in the thin film position measuring apparatus 4 according to the fourth preferred embodiment along with flows of signals.

An image processing part 510 performs general edge detection processing on substrate end image data acquired by an imaging system 60 and detects substrate edge positions in imaging regions for transferring the same to a position detection part 516, similarly to those in the aforementioned first and second embodiments. The image processing part 510 also transfers thin film end image data acquired by the imaging system 60 to a thin film end position detection part 513.

The thin film end position detection part 513 detects thin film edge positions in the imaging regions (film thickness measuring regions) by thickness utilization or image utilization similarly to that in the aforementioned first embodiment, and transfers the same to a position detection part 516.

Every time an inspection stage 40 moves, a movement detection part 515 acquires the position of the moving inspection stage 40 from a sensor 44 for detecting the distance and the direction (hereinafter referred to as "stage movement vector") of movement from a starting point and transferring the same to the position detection part 516. A reference point in the thin film position measuring apparatus 4, a measurement starting point, the center point of the substrate 91 or the proximate position of the inspection stage 40 may be properly utilized as the starting point.

The position detection part 516 acquires the substrate edge positions in a plurality of imaging regions from the image processing part 510 and obtaining the positional relation between the plurality of imaging regions thereby detecting the position of the substrate 91. That is, the image processing part 510 and the position detection part 516 mainly correspond to the first detection element in the present invention. The positional relation between the plurality of imaging regions can be obtained on the basis of the stage movement vector obtained from the movement detection part 515.

The position detection part 516 further acquires thin film edge positions in a plurality of film thickness measuring regions (imaging regions) from the thin film end position detection part 513 and obtains the positional relation between the plurality of film thickness measuring regions thereby detecting the position of the thin film. That is, the thin film end position detection part 513 and the position detection part 516 mainly correspond to the second detection element in the present invention. The positional relation between the plurality of film thickness measuring regions can be obtained on the basis of the stage movement vector obtained from the movement detection part 515.

The position detection part 516 further obtains displacement between the center point of the substrate 91 and the center point of the thin film for comparing the positions of the substrate 91 and the thin film with each other through this displacement. That is, the position detection part 516 mainly corresponds to the comparison element in the present invention.

FIG. 20 is a flow chart showing operations of the thin film position measuring apparatus 4 according to the fourth preferred embodiment. The thin film position measuring apparatus 4 first acquires the shape of the substrate 91 (step S51) and performs substrate edge detection processing (step S52). If the shape of the substrate 91 is not previously input, the thin film position measuring apparatus 4 continues the processing on the assumption that the substrate 91 has a "general form".

FIG. 21 is a flow chart showing the substrate edge detection processing (step S52) in detail. In the substrate edge detection processing, the thin film position measuring apparatus 4 first moves the inspection stage 40 (step S101), so that the imaging system 60 acquires substrate end image data (step S102).

The image processing part 510 detects a substrate edge ES on the basis of the acquired substrate end image data (step S103), and returns to the step S101 to repeat the step S101 if the substrate edge ES is undetectable (step S104). If the substrate edge ES is detectable, the image processing part 510 transfers the substrate edge position to the position detection part 516 (step S105), for ending the substrate edge detection processing and returning to the process shown in FIG. 20.

Upon completion of the substrate edge detection processing (step S52), the movement detection part 515 stores the position of the inspection stage 40 at the time of detecting the substrate edge ES at the step S52 as a starting point (measurement starting position). The movement detection part 515 further specifies an arbitrary point A (e.g., the midpoint of the detected substrate edge ES) on the detected substrate edge ES and stores the positions of the substrate edge ES and the point A with respect to the starting point (step S53).

Then, the thin film position measuring apparatus 4 determines whether or not the shape of the substrate 91 acquired at the step S51 is circular (step S54), for executing circular substrate processing (step S55) when the shape of the substrate 91 is circular.

Figure 22:
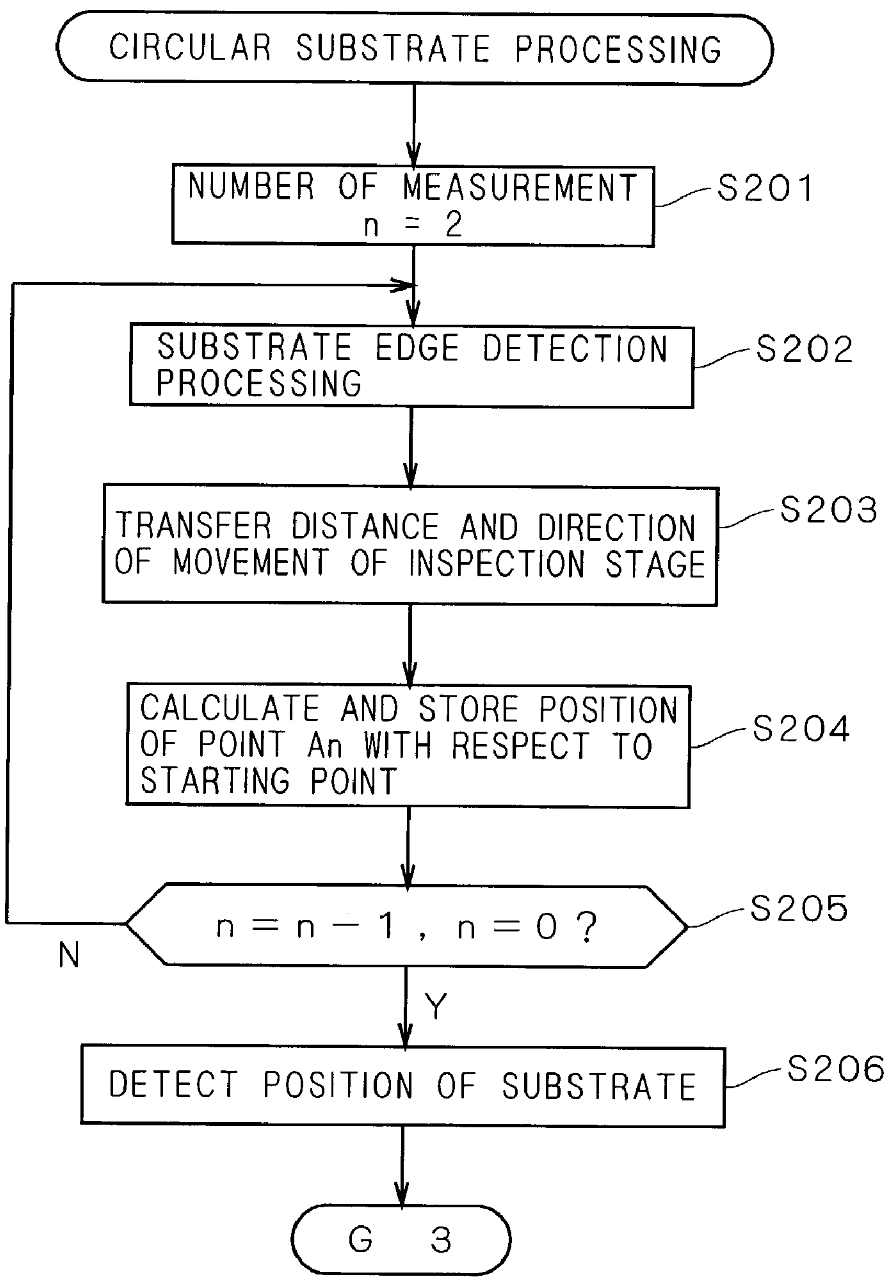
FIGS. 22 and 23 are flow charts showing circular substrate processing in the fourth preferred embodiment in detail.
Figure 23:
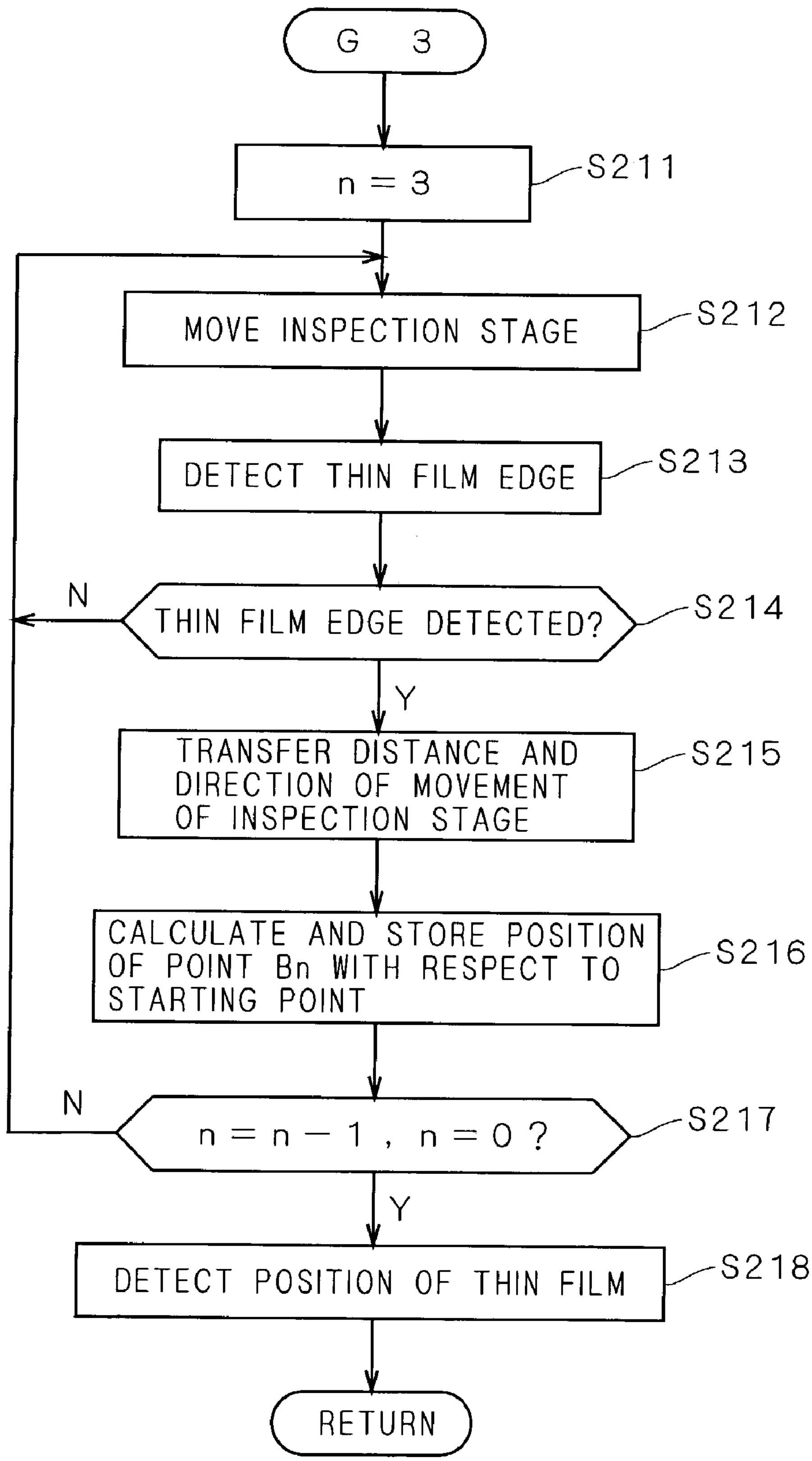
Figure 24:
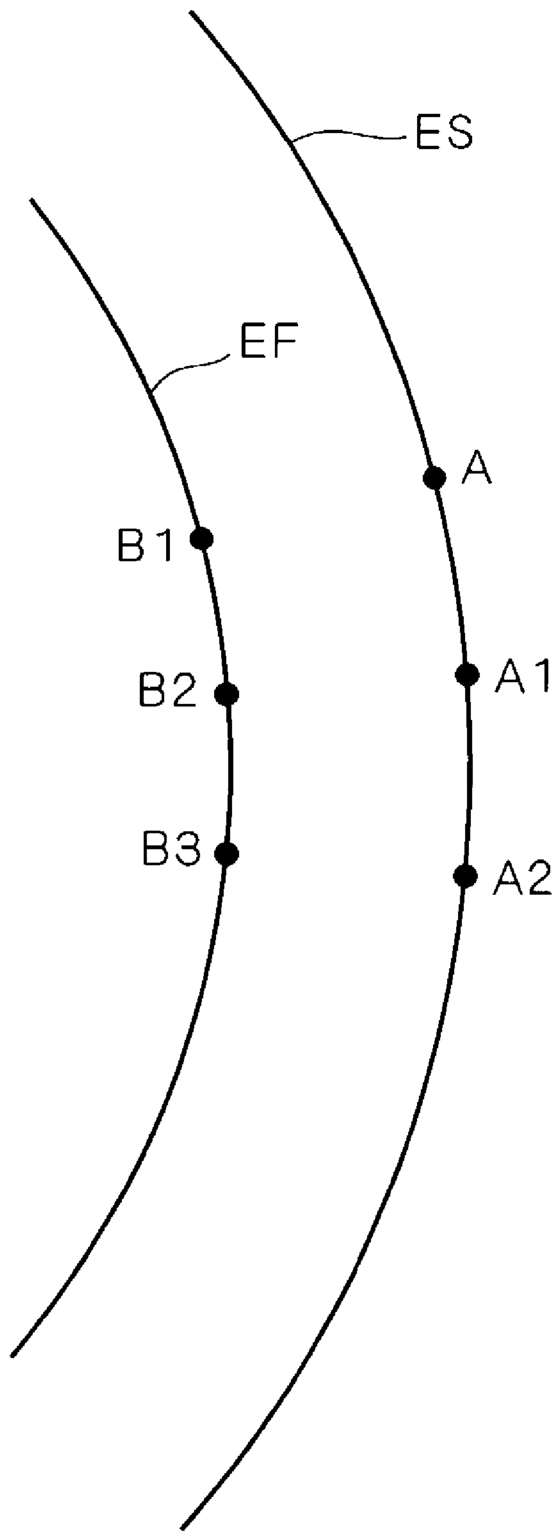
FIG. 24 illustrates exemplary detection corresponding to the circular substrate processing in the fourth preferred embodiment.

FIGS. 22 and 23 are flow charts showing the circular substrate processing (step S55) in detail. FIG. 24 illustrates exemplary detection corresponding to this processing. In the circular substrate processing, the thin film position measuring apparatus 4 sets a measurement number n to 2 (step S201).

Then, the thin film position measuring apparatus 4 performs the substrate edge detection processing shown in FIG. 21 (step S202) so that the movement detection part 515 calculates the stage movement vector at the time of detecting the substrate edge ES at the step S202 and transfers the same to the position detection part 516 (step S203).

Then, the position detection part 516 specifies a point An (e.g., the midpoint of the detected substrate edge ES) on the substrate edge ES detected at the step S202, for calculating a position of the point An with respect to a starting point on the basis of the stage movement vector acquired from the movement detection part 515 and preserving the same (step S204).

The thin film position measuring apparatus 4 decrements the measurement number n and repeats the processing at the steps S202 and S204 until the measurement number n reaches zero (step S205). Thus, the thin film position measuring apparatus 4 acquires the positional relation between three arbitrary points (points A, A1 and A2 in FIG. 24), including the point A detected on the measurement starting position, on the substrate edge ES.

Upon acquisition of the positional relation between the three points on the substrate edge ES, the position detection part 516 detects the position of the substrate 91 as a circle passing through the acquired three points through the circular shape of the substrate 91. The number of the points on the substrate edge ES is not restricted to three but positional relation may alternatively be acquired as to a larger number of points.

When detecting the position of the substrate 91, the thin film position measuring apparatus 4 performs processing of detecting the position of the thin film.

First, the thin film position measuring apparatus 4 sets the measurement number n to 3 (step S211) and moves the inspection stage 40 (step S212) so that the thin film end position detection part 513 detects a thin film edge EF (step S213). If the thin film edge EF is undetectable, the thin film position measuring apparatus 4 repeats the processing from the step S212 (step S214). It is assumed that the thin film edge EF can be detected by either the film thickness utilization or the image utilization described with reference to the aforementioned first preferred embodiment and is properly selected in response to the property of the thin film.

When detecting the thin film edge EF, the thin film end position detection part 513 transfers the detected thin film edge position to the position detection part 516, and the movement detection part 515 calculates the stage movement vector at the time of detecting the thin film edge EF at the step S213 for transferring the same to the position detection part 516 (step S215).

Then, the position detection part 516 specifies a point Bn (e.g., the midpoint of the detected thin film edge EF) on the thin film edge EF detected at the step S213 for calculating the position of the point Bn with respect to a starting position on the basis of the stage movement vector acquired from the movement detection part 515 and storing the same (step S216).

The thin film position measuring apparatus 4 decrements the measurement number n and repeats the processing at the steps S212 to S216 until the measurement number n reaches zero (step S217). Thus, the thin film position measuring apparatus 4 also acquires positional relation with respect to the starting point as to three arbitrary points (points B1 to B3 in FIG. 24) on the thin film edge EF.

When acquiring the positional relation between the three points on the thin film edge EF, the position detection part 516 detects the position of the thin film as a circle passing through the three points (step S128) thereby terminating the circular substrate processing and returning to the processing shown in FIG. 20.

If the shape of the substrate 91 is not circular (No at the step S54), the thin film position measuring apparatus 4 further determines whether or not the shape of the substrate 91 is rectangular (step S56), for executing rectangular substrate processing (step S57) if the shape of the substrate 91 is rectangular.

Figure 25:
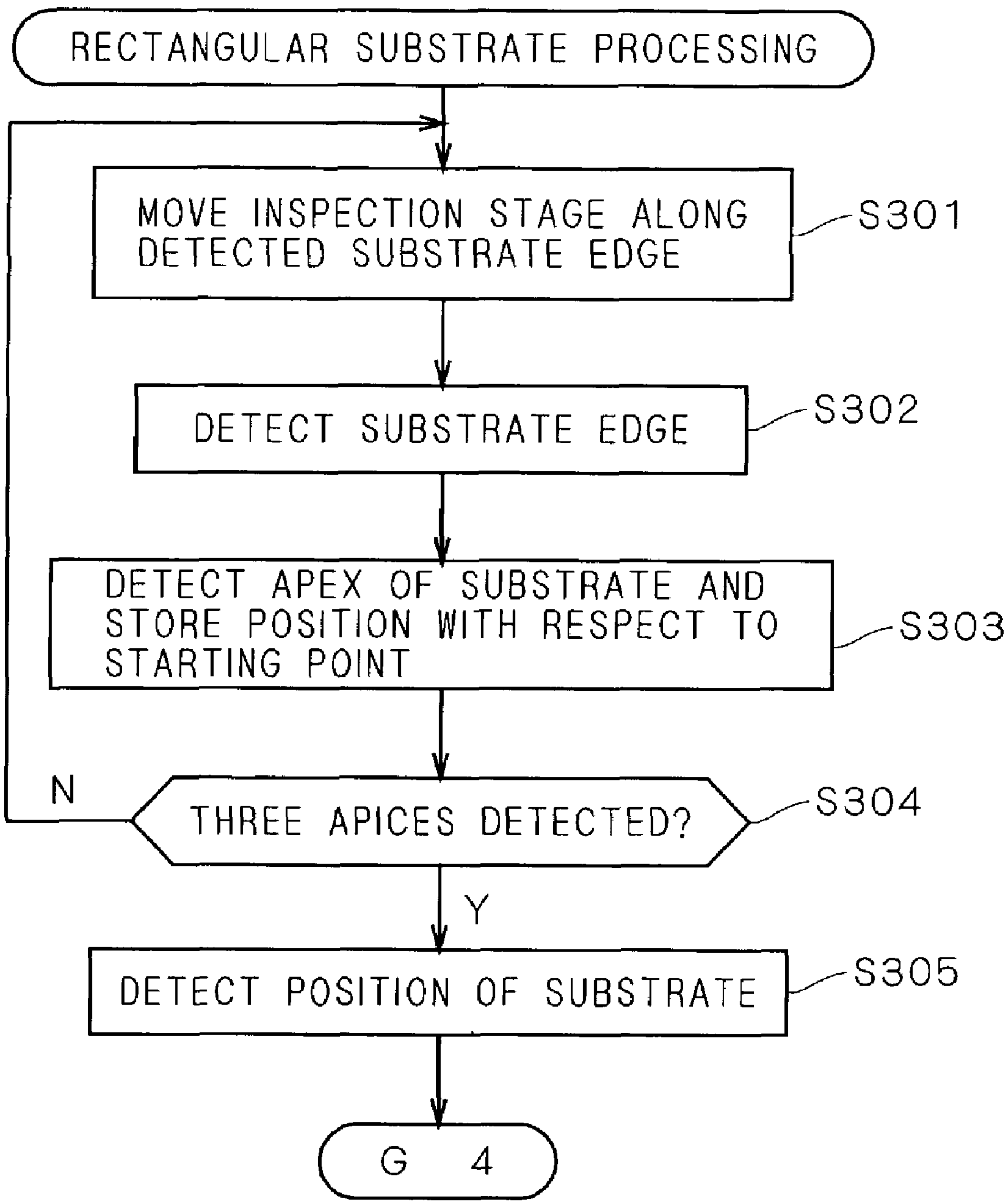
FIGS. 25 and 26 are flow charts showing rectangular substrate processing in the fourth preferred embodiment in detail.
Figure 26:
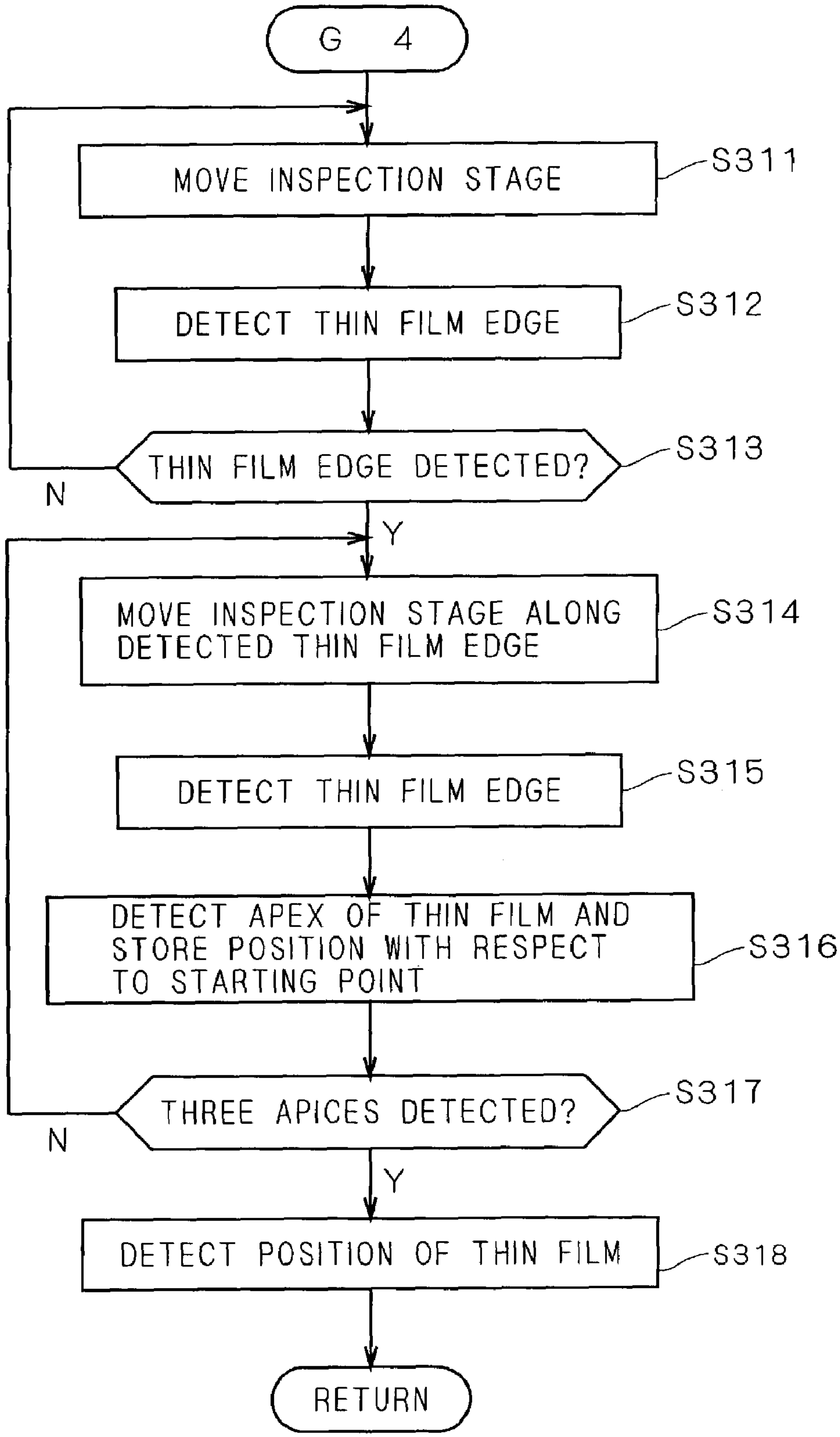

FIGS. 25 and 26 are flow charts showing the rectangular substrate processing (step S57) in the fourth preferred embodiment in detail. FIG. 27 illustrates exemplary detection corresponding to this processing. In the rectangular substrate processing, the thin film position measuring apparatus 4 first moves the inspection stage 40 along the substrate edge ES detected at the step S52 (step S301), further detects the substrate edge ES (step S302), and detects an apex of the substrate 91 and stores the position with respect to the starting point (step S303). The apex of the substrate 91 can be detected as a point where the direction of the detected substrate edge ES changes by 90°, for example.

The thin film position measuring apparatus 4 further repeats the steps S301 to S303 until detecting three apices AP1 to AP3 of the substrate 91 at a step S304.

When acquiring the positional relation between the three apices AP1 to AP3 of the substrate 91, the position detection part 516 detects the position of the substrate 91 through the rectangular shape of the substrate 91. The method for detecting the position of the rectangular substrate 91 is not restricted to the above but two apices (e.g., the apices AP1 and AP3 in FIG. 27) located on diagonal positions of the rectangular substrate 91 may alternatively be obtained, for example. In other words, another well-known mathematical method may be employed so far as the same can decide the position of the rectangular substrate 91.

When detecting the position of the substrate 91, the thin film position measuring apparatus 4 performs processing of detecting the position of the thin film.

The thin film position measuring apparatus 4 first moves the inspection stage 40 (step S311), detects the thin film edge EF (step S312) and repeats the processing from the step S311 if the thin film edge EF is undetectable (step S313).

When detecting the thin film edge EF, the thin film position measuring apparatus 4 moves the inspection stage 40 along the detected thin film edge (EF) (step S314), further detects the thin film edge EF (step S315), and detects the apex of the thin film and stores the position with respect to the starting point (step S316).

Further, the thin film position measuring apparatus 4 repeats the processing at the steps S314 to S316 until detecting the positions of three apices (BP1 to BP3 in FIG. 27) of the thin film at a step S317, so that the position detection part 516 thereafter detects the position of the thin film on the basis of the positional relation between the detected three apices BP1 to BP3 (step S318). When detecting the position of the thin film, the thin film position measuring apparatus 4 terminates the rectangular substrate processing and returns to the processing shown in FIG. 20.

If the shape of the substrate 91 is not rectangular (No at the step S56), the thin film position measuring apparatus 4 executes general substrate processing (step S58).

FIGS. 28 and 29 are flow charts showing the general substrate processing (step S58) in the fourth preferred embodiment in detail. FIG. 30 illustrates exemplary detection corresponding to the processing. In the general substrate processing, the thin film position measuring apparatus 4 first moves the inspection stage 40 along the detected substrate edge ES (step S401), further detects the substrate edge ES (step S402) and stores the position of the substrate edge ES with respect to the starting point (step S403).

The thin film position measuring apparatus 4 repeats the processing at the steps S401 to S403 until returning to the position of the point A at a step S404, so that the position detection part 516 detects the shape and the position of the substrate 91 on the basis of the substrate edge position acquired from the image processing part 510 and the stage movement vector acquired from the movement detection part 515 (step S405).

Thus, the thin film position measuring apparatus 4 can detect the shape and the position of the substrate 91 regardless of the shape of the substrate 91 by starting measurement from the point A on the substrate edge ES, moving the inspection stage 40 along the substrate edge ES and measuring the positions A and A1 to An on the substrate edge ES until returning to the point A (this corresponds to measurement of all points on a closed curve of the substrate edge ES).

Then, the thin film position measuring apparatus 4 moves the inspection stage 40 (step S411) so that the thin film end position detection part 513 detects the thin film edge EF (step S412), and repeats the processing from the step S411 if the thin film edge EF is undetectable (step S413).

When detecting the thin film edge EF, the thin film end position detection part 513 transfers the detected thin film edge position to the position detection part 516 while the movement detection part 515 transfers the stage movement vector to the position detection part 516. On the basis of this information, the position detection part 516 calculates and stores the position of the thin film edge EF with respect to the starting point and the position of an arbitrary point C (e.g., the midpoint of the detected thin film edge EF) on the thin film edge EF (step S414).

Further, the thin film position measuring apparatus 4 moves the inspection stage 40 along the detected thin film edge EF (step S415) so that the thin film end position detection part 513 detects the thin film edge EF (step S416) and the position detection part 516 calculates and stores the position of the thin film edge EF with respect to the starting point (step S417).

The thin film position measuring apparatus 4 repeats the processing at the steps S415 to S417 at a step S418 until returning to the point C, so that the position detection part 516 detects the shape and the position of the thin film on the basis of the positions C and C1 to Cn of the detected thin film edge EF with respect to the starting point (step S419), for terminating the general substrate processing and returning to the processing shown in FIG. 20.

When detecting the positions of the substrate 91 and the thin film at the steps S55, S57 and S58, the position detection part 516 compares the positions of the substrate 91 and the thin film with each other (step S59). The thin film position measuring apparatus 4 obtains both of the positions of the substrate 91 and the thin film with respect to the starting points, whereby the position detection part 516 can compare the positions of the substrate 91 and the thin film with each other with no requirement of coordinate transformation or the like.

Thus, the thin film position measuring apparatus 4 can measure the formation position of the thin film with respect to the substrate 91 by comparing the position of the substrate 91 obtained by detecting the plurality of end positions of the substrate and the position of the thin film obtained by detecting the plurality of end positions of the thin film with each other for confirming whether or not the thin film is formed on a desired position of the substrate 91, for example.

When the substrate 91 is circular or rectangular, the thin film position measuring apparatus 4 obtains displacement between center points O1 and O2 of the substrate 91 and the thin film for comparing the positions of the substrate 91 and the thin film with each other through this displacement.

Figure 31A:
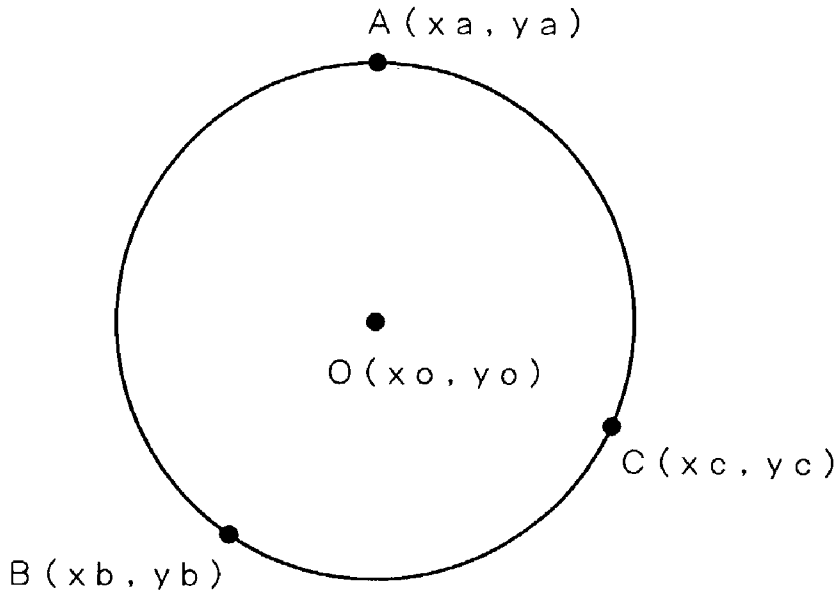
FIGS. 31A and 31B illustrate methods of obtaining the center points of circular and rectangular substrates respectively.

As shown in FIG. 31A, the coordinates of the center point of a circle can be 10 obtained by substituting the coordinates of at least three arbitrary points on the circumference in the equation of the circle.

When the substrate 91 is circular, therefore, the position detection part 516 obtains the coordinates of the center point O1 from the coordinates of the three points A, A1 and A2 on the substrate edge ES obtained in the circular substrate processing (FIGS. 22 and 23) while obtaining the coordinates of the center point O2 from the coordinates of the three points B1 to B3 on the thin film edge EF. The position detection part 516 further obtains the displacement (intercoordinate distance) from the coordinates of the center points O1 and O2. The method of obtaining the center point of the circle is not restricted to that shown in FIG. 31A but another well-known mathematical method may alternatively be employed for drawing vertical bisectors with respect to segments connecting three arbitrary points on the circumference, obtaining the coordinates of intersections and regarding the coordinates of the intersections as those of the center point of the circle, for example.

Figure 31B:
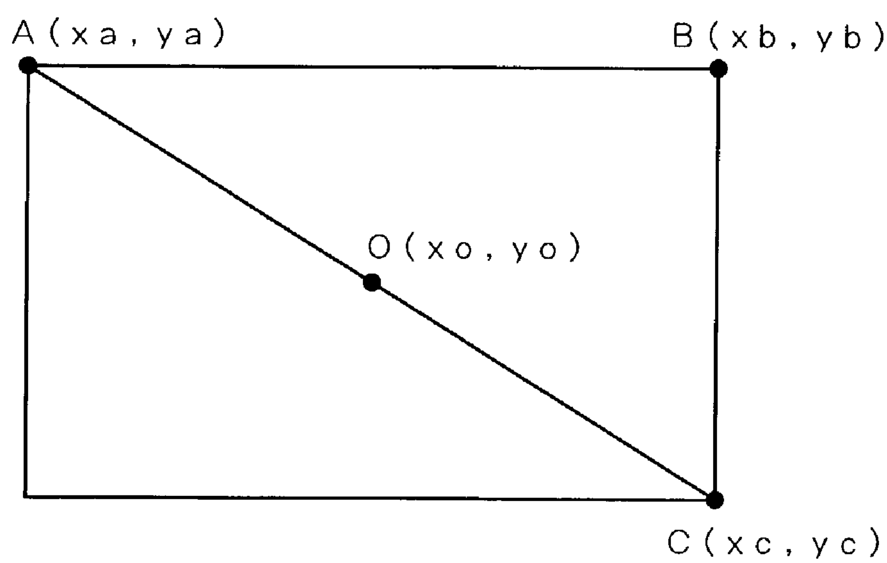

When the substrate 91 is rectangular, the coordinates of a center point O can be obtained from the coordinates of diagonal positions through the fact that the center point of a segment connecting the diagonal positions (points A and C in FIG. 31B) expresses the center point O of a rectangle, as shown in FIG. 31B.

When the substrate 91 is rectangular, therefore, the position detection part 516 obtains the coordinates of the center point O1 from the coordinates of the two points AP1 and AP3 on the substrate edge ES obtained through the rectangular substrate processing (FIGS. 25 and 26) and obtains the coordinates of the center point O2 from the coordinates of the two points BP1 and BP3 on the thin film edge EF. Further, the position detection part 516 obtains the displacement (inter-coordinate distance) therebetween from the coordinates of the center points O1 and O2. Another well-known mathematical method may alternatively be employed also as to the center point of the rectangle.

Thus, the thin film position measuring apparatus 4, capable of measuring the formation position of the thin film with respect to the substrate 91 without through an operator, can correctly confirm whether or not the thin film is formed on a desired position with no influence by the degree of experience or skillfulness of the operator.

A similar effect can be attained also when illuminating the substrate edge ES with a light source 25 in place of a reflecting mirror 41 as shown in the third preferred embodiment. While the thin film position measuring apparatus 4 according to the fourth preferred embodiment separately images the substrate edge ES and the thin film edge EF, a similar effect can be attained also when employing an imaging system, having a relatively wide imaging region, capable of simultaneously imaging the substrate edge ES and the thin film edge EF similarly to that in the first preferred embodiment. This also applies to a fifth preferred embodiment described below.

<5. Fifth Preferred Embodiment>

While the thin film position measuring apparatus 4 according to the fourth preferred embodiment obtains the formation position of the thin film with respect to the substrate by detecting the positions of plural points present on the substrate edge ES and the thin film edge EF, the method of obtaining the formation position is not restricted to this but the formation position of the thin film can also be detected by obtaining edge rinsed widths on a plurality of points present on the substrate edge ES.

Figure 32:
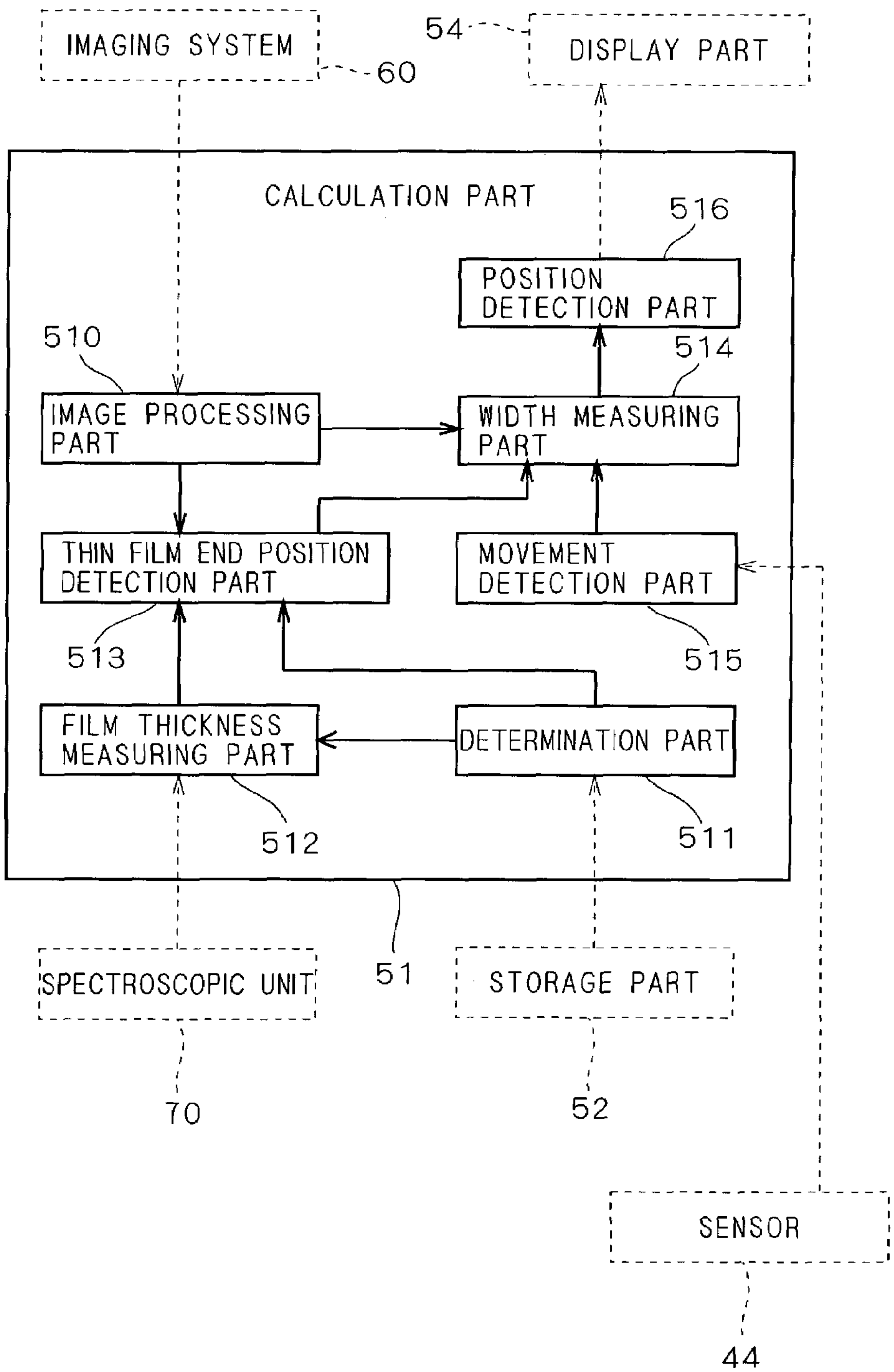
FIG. 32 illustrates the functional structure of a calculation part of a thin film position measuring apparatus according to a fifth preferred embodiment of the present invention with flows of signals.

FIG. 32 illustrates the functional structure of a calculation part 51 of a thin film position measuring apparatus 5 according to the fifth preferred embodiment of the present invention structured on the basis of this principle with flows of signals. The structure of the thin film position measuring apparatus 5 is similar to that of the thin film position measuring apparatus 4 shown in FIG. 18.

A width measuring part 514 calculates an edge rinsed width on a point D of a substrate edge detected by an image processing part 510 by the method described with reference to the second preferred embodiment. First, the width measuring part 514 acquires a stage movement vector from a movement detection part 515 and calculates the position of the point D with respect to a starting point. The width measuring part 514 further has a function of transferring the position of the point D with respect to the starting point and the edge rinsed width on the point D to a position detection part 516. That is, the width measuring part 514 corresponds to the calculation element in the present invention.

The position detection part 516 detects a formation position of a thin film with respect to a substrate 91 on the basis of information acquired from the width measuring part 514.

FIG. 33 is a flow chart showing operations of the thin film position measuring apparatus 5 according to the fifth preferred embodiment. First, the thin film position measuring apparatus 5 acquires the shape of the substrate 91 (step S61), and performs substrate edge detection processing (step S62) identical to that shown in FIG. 21. If the shape of the substrate 91 is not previously input, the thin film position measuring apparatus 5 continues the processing on the assumption that the substrate 91 has a "general form".

When terminating the substrate edge detection processing (step S62), the movement detection part 515 stores the position of an inspection stage 40 at the time of detecting a substrate edge ES at the step S62 as the starting point (measurement starting position) (step S63).

Then, the thin film position measuring apparatus 5 determines whether or not the shape of the substrate 91 acquired at the step S61 is circular (step S64), and executes circular substrate processing (step S65) if the shape of the substrate 91 is circular.

Figure 34:
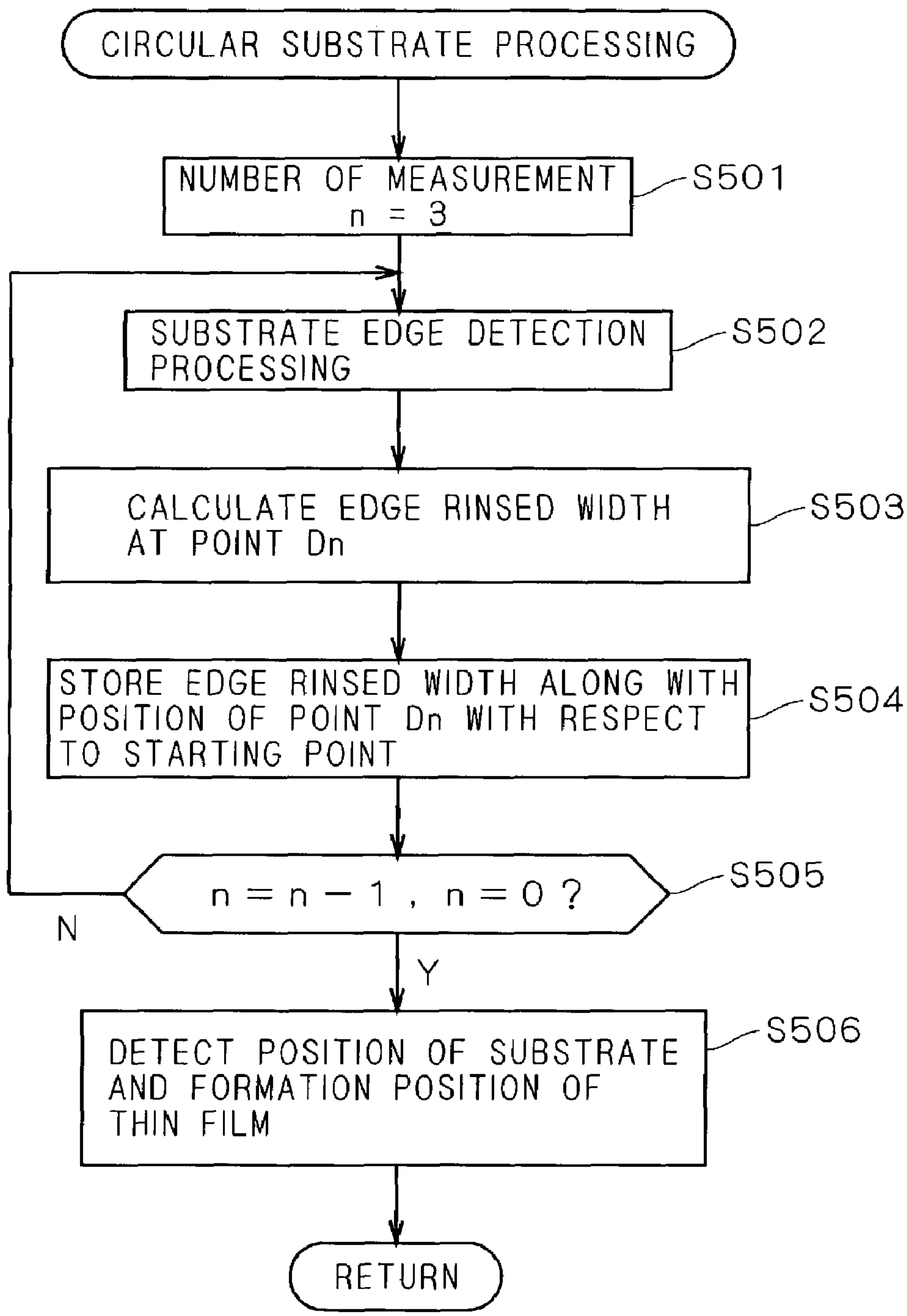
FIG. 34 is a flow chart showing circular substrate processing in the fifth preferred embodiment in detail.
Figure 35:
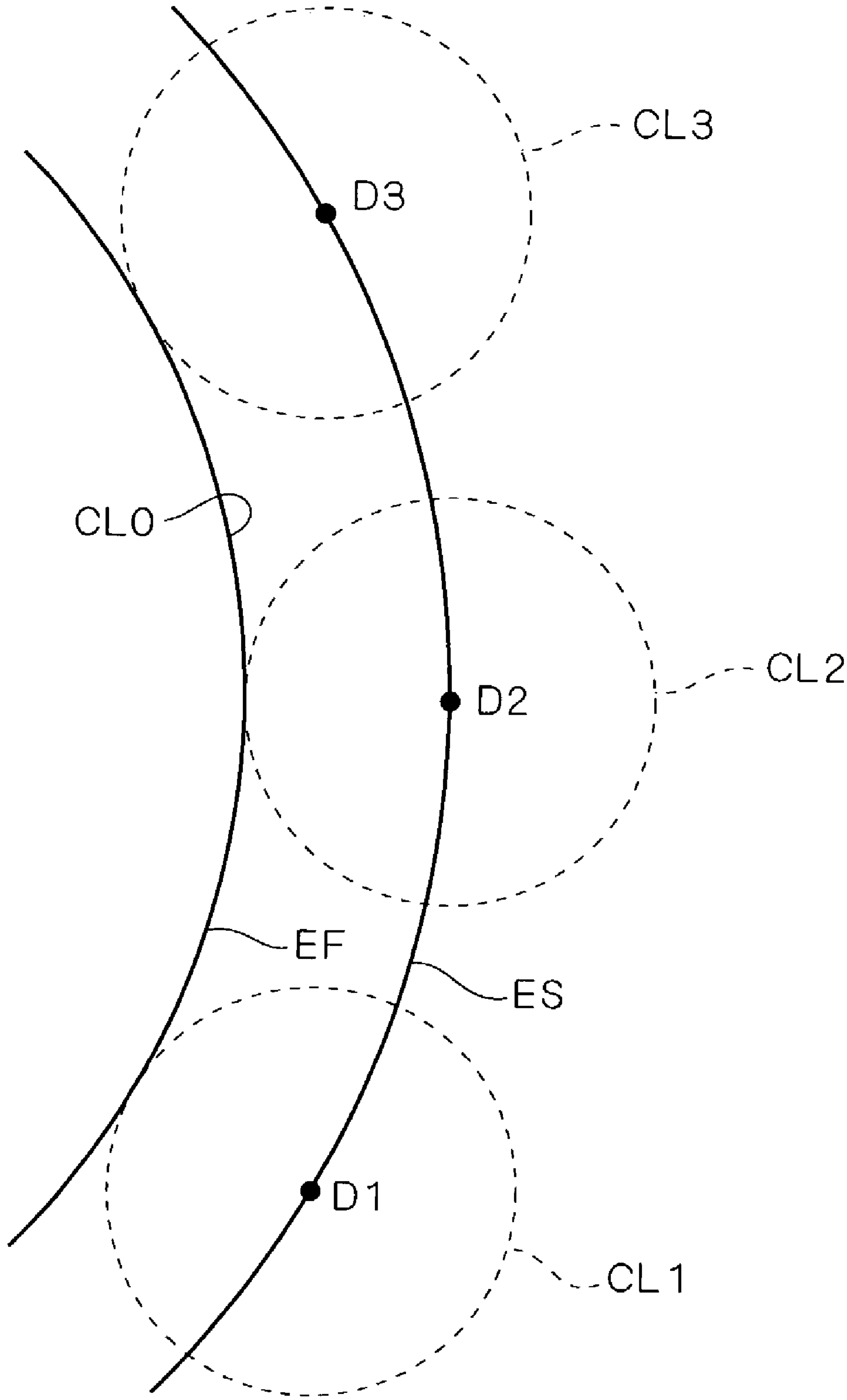
FIG. 35 illustrates exemplary detection corresponding to the circular substrate processing in the fifth preferred embodiment.

FIG. 34 is a flow chart showing the circular substrate processing (step S65) in the fifth preferred embodiment in detail. FIG. 35 illustrates exemplary detection corresponding to this processing. In the circular substrate processing, the thin film position measuring apparatus 5 first sets a measurement number n to 3 (step S501), and executes the substrate edge detection processing similar to that shown in FIG. 21 (step S502).

Then, the width measuring part 514 specifies a point Dn (e.g., the midpoint of the detected substrate edge ES) of the substrate edge ES detected by the image processing part 510 at the step S502 and calculates the edge rinsed width on the point Dn (step S503). The width measuring part 514 further transfers the position of the point Dn with respect to the starting point and the edge rinsed width on the point Dn to the position detection part 516. The position detection part 516 stores this information (step S504).

The thin film position measuring apparatus 5 repeats the steps S502 to S504 while decrementing the measurement number n at a step S505 until the measurement number n reaches zero, for obtaining three points (D1 to D3 in FIG. 35) on the substrate edge ES and edge rinsed widths on the points.

Then, the position detection part 516 detects the positions of the substrate 91 and the thin film (step S506). When detecting the formation position of the thin film on the circular substrate 91, the thin film position measuring apparatus 5 terminates the circular substrate processing and returns to the processing shown in FIG. 33. The thin film position measuring apparatus 5 detects the position of the substrate 91 as a circle passing through the three points on the substrate edge ES on the basis of the positional relation between the three points and the starting point, similarly to the circular substrate processing in the fourth preferred embodiment. The thin film position measuring apparatus 5 detects the formation position of the thin film as a circle CL0 circumscribed with three circles CL1 to CL3 having edge rinsed widths at center points as radii about the three points respectively.

Thus, the thin film position measuring apparatus 5 can measure the formation position of the thin film on the basis of the edge rinsed widths on a plurality of measuring portions (the points D1 to D3) when the substrate 91 is circular.

The thin film position measuring apparatus 5 determines whether or the substrate 91 is rectangular (step S66) if the shape of the substrate 91 is not circular (No at the step S64) while executing rectangular substrate processing (step S67) if the substrate 91 is rectangular.

Figure 36:
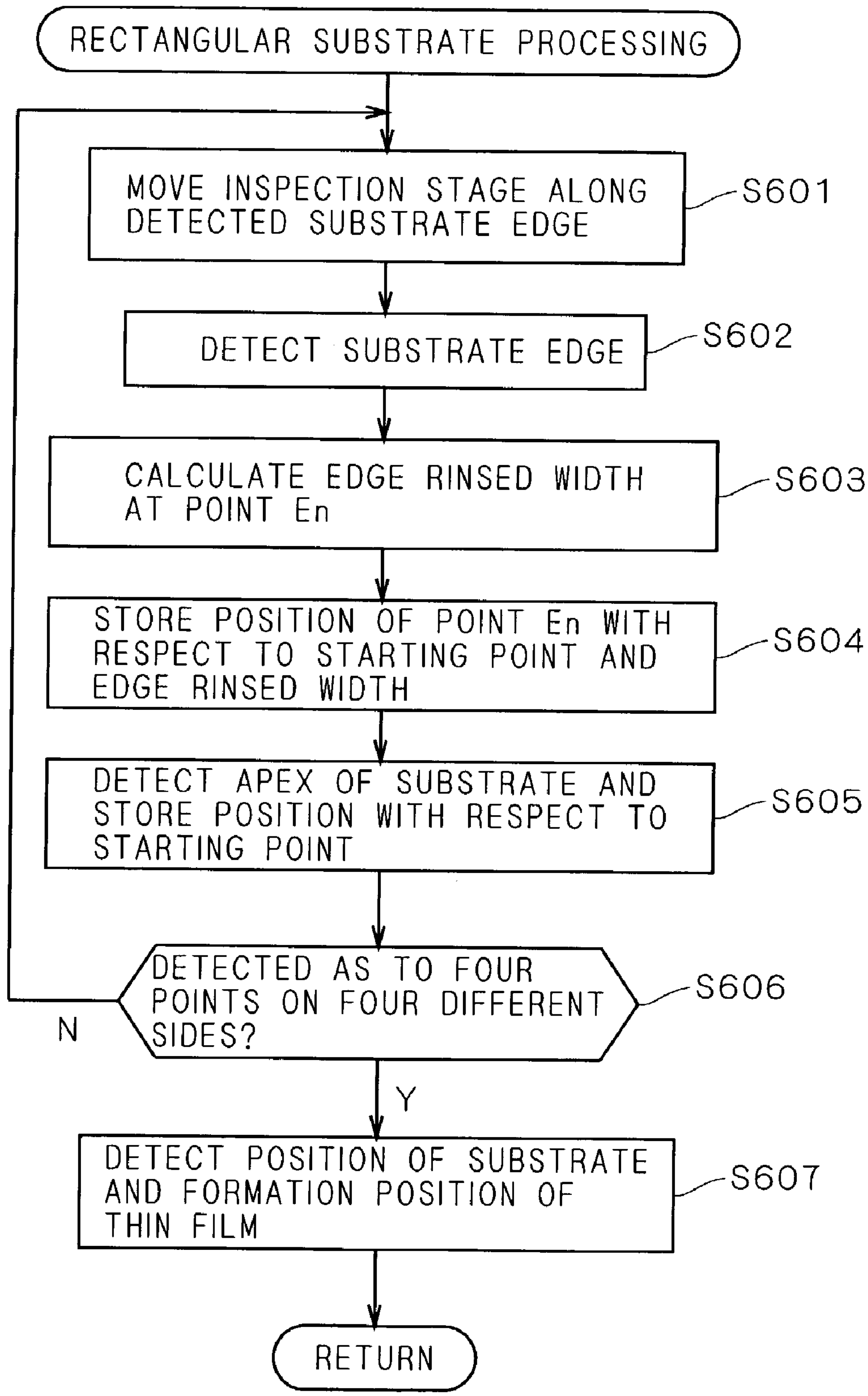
FIG. 36 is a flow chart showing rectangular substrate processing in the fifth preferred embodiment in detail.
Figure 37:
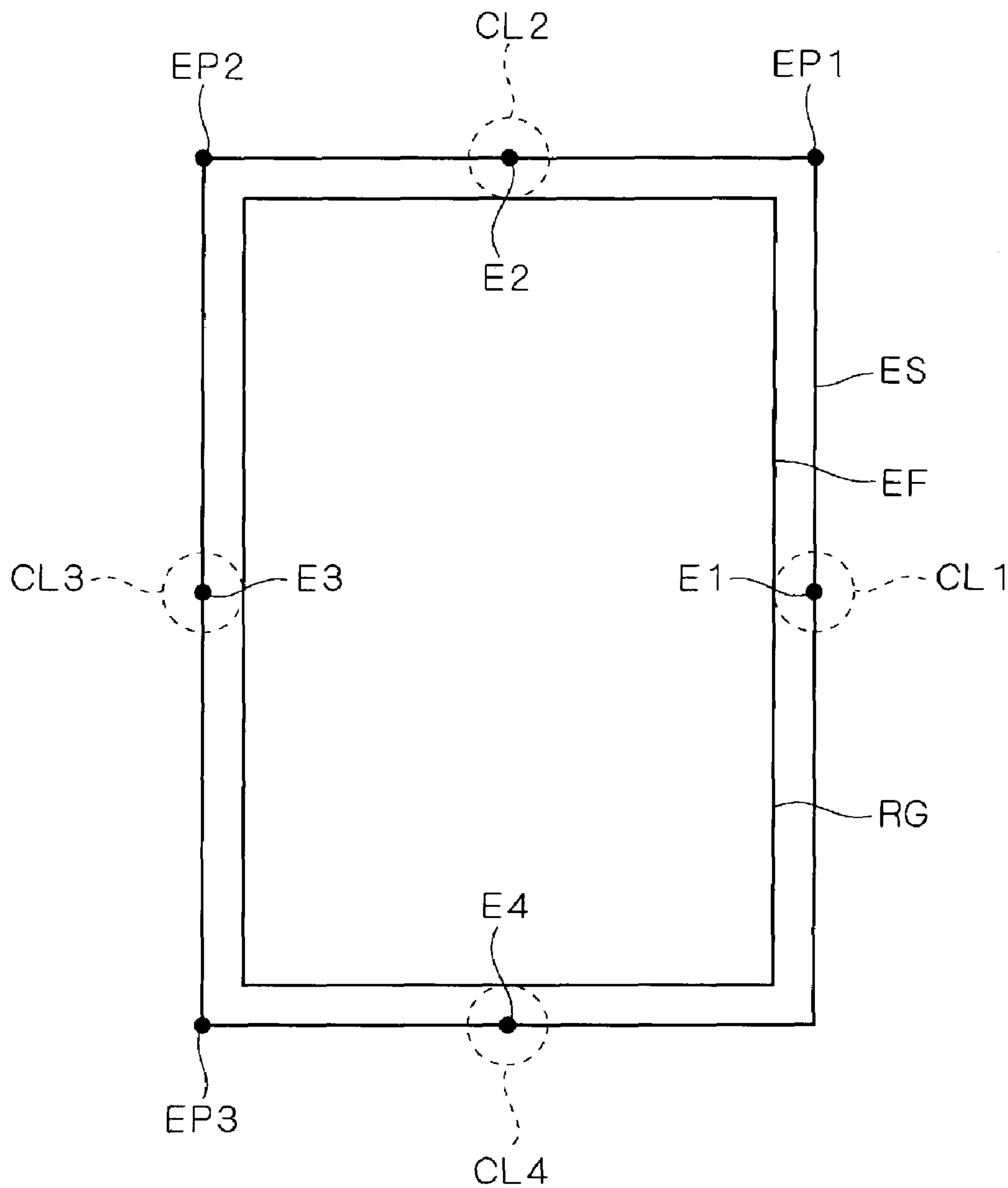
FIG. 37 illustrates exemplary detection corresponding to the rectangular substrate processing in the fifth preferred embodiment.

FIG. 36 is a flow chart showing the rectangular substrate processing (step S67) in the fifth preferred embodiment in detail. FIG. 37 illustrates exemplary detection corresponding to this processing. In the rectangular substrate processing, the thin film position measuring apparatus 5 first moves the inspection stage 40 along the substrate edge ES detected at the step S62 (step S601), so that the image processing part 510 detects the substrate edge ES (step S602).

Then, the width measuring part 514 measures the edge rinsed width on a point En of the substrate edge ES detected at the step S602 (step S603). The width measuring part 514 transfers the position of the point En with respect to the starting point and the edge rinsed width on the point En to the position detection part 516, which in turn stores this information (step S604). The width measuring part 514 obtains an apex of the substrate 91 by detecting change of the direction of detection of the substrate edge ES and stores the position with respect to the starting point (step S605).

The thin film position measuring apparatus 5 repeats the processing at the steps S601 to S603 until obtaining edge rinsed widths (until the direction of the substrate edge ES changes at least three times) on four points (points E1 to E4 in FIG. 37) present on four different sides of the substrate 91 at a step S605, so that the position detection part 516 detects the position of the substrate 91 and the formation position of the thin film (step S606). When detecting the formation position of the thin film on the rectangular substrate 91, the thin film position measuring apparatus 5 terminates the rectangular substrate processing and returns to the processing shown in FIG. 33.

Thus, the thin film position measuring apparatus 5 repeats the processing at the steps S601 to S603 until obtaining the four points on the four different sides of the substrate 91, thereby acquiring the positional relation between at least three apices (EP1 to EP3 in FIG. 37) on the substrate 91 with respect to the starting point. Therefore, the thin film position measuring apparatus 5 detects the position of the substrate 91 from the positional relation between the three apices. The thin film position measuring apparatus 5 detects the formation position of the thin film as a rectangle RG circumscribed with four circles CL1 to CL4 having edge rinsed widths at center points as radii about the points E1 to E4.

Thus, the thin film position measuring apparatus 5 can measure the formation position of the thin film on the rectangular substrate 91 on the basis of the edge rinsed widths on the plurality of measuring portions (the points El to E4).

If the substrate 91 is not rectangular (No at the step S66), the thin film position measuring apparatus 5 executes general substrate processing (step S68).

Figure 39:
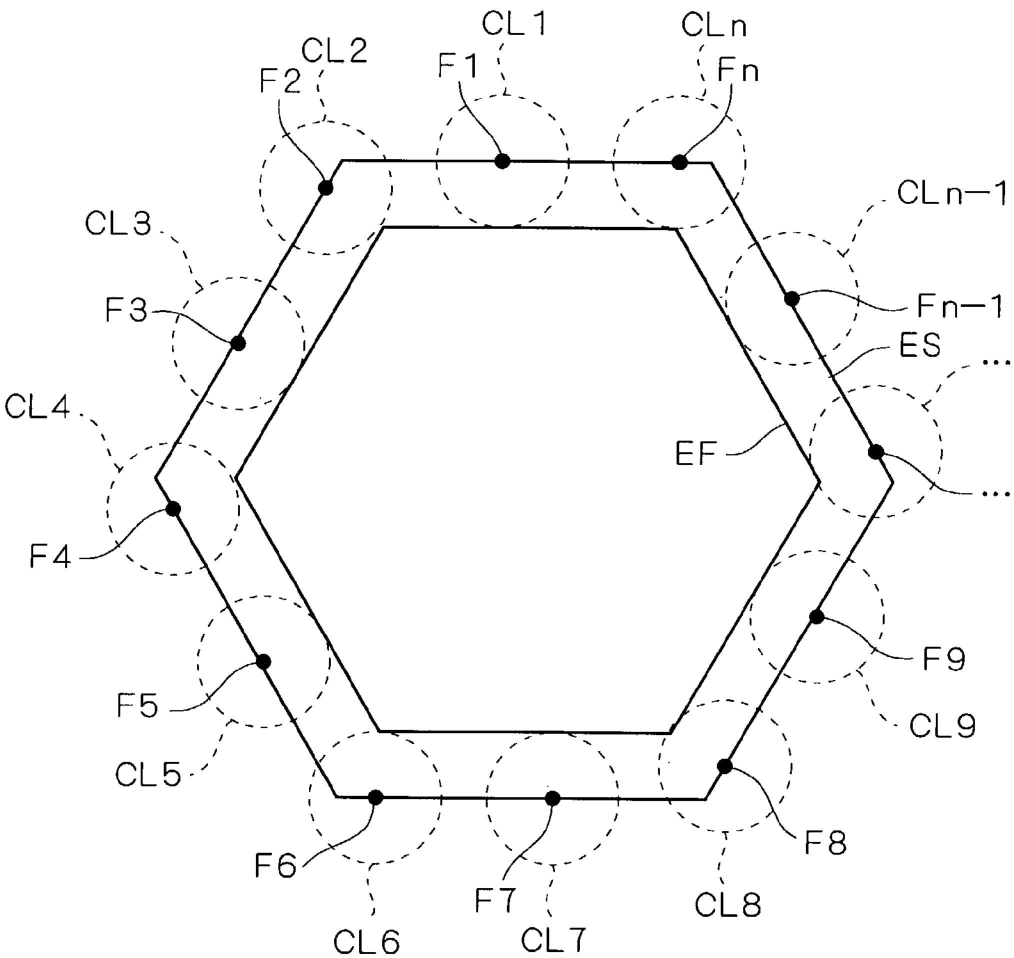
FIG. 39 illustrates exemplary detection corresponding to the general substrate processing in the fifth preferred embodiment.

FIG. 38 is a flow chart showing the general substrate processing (step S68) in the fifth preferred embodiment in detail. FIG. 39 illustrates exemplary detection corresponding to this processing. In the general substrate processing, the thin film position measuring apparatus 5 first moves the inspection stage 40 along the detected substrate edge ES (step S701), so that the image processing part 510 detects the substrate edge ES (step S702) and the width measuring part 514 calculates the edge rinsed width on the point of the substrate edge ES detected at the step S702 (step S703).

Further, the position detection part 516 stores the position of the detected substrate edge ES with respect to the starting point and the edge rinsed width (step S704). The position detection part 516 stores the position with respect to the starting point while regarding a point F of first calculation of the edge rinsed width on the substrate edge ES as the starting point at a step S703.

The thin film position measuring apparatus 5 repeats the steps S701 to S704 until the point on the substrate edge ES for detecting the edge rinsed width returns to the starting point F at a step S705, so that the position detection part 516 detects the shape of the substrate 91 and positions F1 to Fn as well as the shape and the formation position of the thin film (step S706).

Thus, the thin film position measuring apparatus 5 can detect the shape and the position of the substrate 91 by detecting the positions of the points on the substrate edge ES with respect to the starting point F until returning to the starting point F. The thin film position measuring apparatus 5 detects the shape and the formation position of the thin film as the circle CP and the formation position circumscribed with respect to all circles CL1 to CLn having the edge rinsed widths about the points F1 to Fn on the substrate edge ES as radii.

Thus, the thin film position measuring apparatus 5 can measure the formation position of the thin film on the basis of edge rinsed widths on the plurality of measuring portions (the points F1 to Fn) when the substrate 91 has a general shape.

When detecting the shape and the formation position of the thin film formed on the general substrate 91, the thin film position measuring apparatus 5 terminates the general substrate processing and returns to the processing shown in FIG. 33.

Thus, the thin film position measuring apparatus 5 according to the fifth preferred embodiment can also automatically measure the formation position of the thin film with respect to the substrate 91 with no influence by the degree of experience or skillfulness of an operator similarly to the fourth preferred embodiment. Therefore, when one of edge rinsed widths on opposite two points of the substrate edge ES is shorter, for example, it is understood that the thin film deviates in this direction.

<6. Modifications>

The reflecting mirror 41 and the light source 25 for illuminating the end of the substrate 91 from the side of the second main surface may be arranged on positions opposed to the objective lens 31 when imaging the end of the substrate 91, to be moved along with the inspection stage 40 or positionally fixed to the objective lens 31.

While the aforementioned third preferred embodiment employs the light sources 21 and 25 for illumination, an optical fiber member or the like may alternatively guide the light emitted from the light source 21 toward the second main surface thereby illuminating the substrate 91 from the side of the second main surface.

The width measuring apparatus 1, 2 or 3 according to the first, second or third preferred embodiment, defining the minimum distance between the arbitrary point P on the substrate edge ES and the thin film edge EF as the edge rinsed width, may alternatively obtain a normal L with respect to the substrate edge ES at the point P, for example, for obtaining the position of the intersection R between the normal L and the thin film edge EF and regarding the distance between the points P and R as the edge rinsed width. When the substrate 91 is circular, the width measuring apparatus 1, 2 or 3 may further alternatively obtain a straight line M connecting the center point 0 of the substrate 91 and the point P for further obtaining an intersection T between the straight line M and the thin film edge EF and defining the distance between the points P and T as the edge rinsed width. In this case, the center point O of the substrate 91 may be obtained by detecting at least three points on the substrate edge ES or measuring the quantity of decentering of the substrate edge ES by rotating the substrate 91 and predicting displacement between the rotation center of the substrate 91 and the center point O.

The order of the processing is not restricted to that in each of the aforementioned preferred embodiments. For example, the inventive apparatus may alternatively detect the substrate edge position after detecting the thin film edge position for obtaining the edge rinsed width by calculating the distance between an arbitrary point and the substrate edge.

Each of the width measuring apparatuses 1 to 3 and the thin film position measuring apparatuses 4 and 5 may alternatively measure not only the edge rinsed width but also a removal width of part of a resist thin film removed by development processing following edge exposure or a formation position of a thin film formed by this removal.

While the object of measurement of each of the aforementioned preferred embodiments is a resist thin film, the material for the thin film is not restricted to the resist. For example, the inventive apparatus may alternatively be applied to a thin film of a metal such as copper formed on a substrate by plating or the like. Also when a copper film is formed on the substrate, an unnecessary part of the copper film is formed on an end of the substrate and removed by bevel etching or the like. In other words, each of the width measuring apparatuses 1 to 3 and the thin film position measuring apparatuses 4 and 5 may alternatively measure the removal width of the unnecessary part of the copper film or the formation position of the copper film after the removal processing. However, the thin film of a metal transmits no light and hence the film thickness utilization cannot be employed. In this case, therefore, the inventive apparatus detects the thin film edge position by the image utilization.

It is also possible to measure the width between the thin film edge and the substrate edge or the formation position as to a thin film, such as a silicon oxide film, a silicon nitride film or an ITO (indium tin oxide) film, for example, other than the resist thin film or the copper film. As to an achromatic transparent film such as the ITO film having no contrast with the substrate, the image utilization cannot be employed and hence the thin film edge position is detected by the film thickness utilization. When the method of detecting the thin film edge position must be selected in response to the material for the thin film, the determination part 511 may determine either the film thickness utilization or the image utilization on the basis of the aforementioned set information at the step S15 shown in FIG. 9.

Thus, each of the width measuring apparatuses 1 to 3 and the thin film position measuring apparatuses 4 and 5 according to the present invention can distinguish the case of obtaining the end of the thin film from the measured thickness and the case of obtaining the same from the acquired image data from each other, for performing measurement responsive to the property of the thin film formed on the substrate.

When the substrate and the region outside the substrate are not contrasted with each other (e.g., in a case of an untrimmed rectangular glass substrate for a liquid crystal display) in the acquired substrate end image data, the substrate edge may be detected through an optical filter.

Figure 40A:
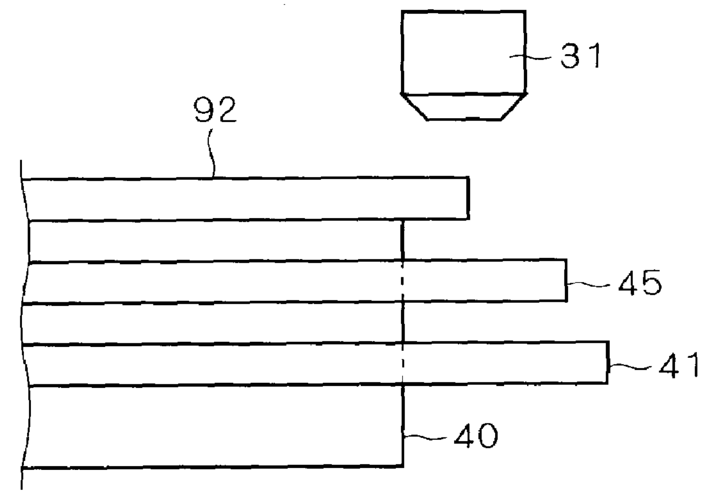
FIG. 40A illustrates an inspection stage comprising an ND filter.
Figure 40B:
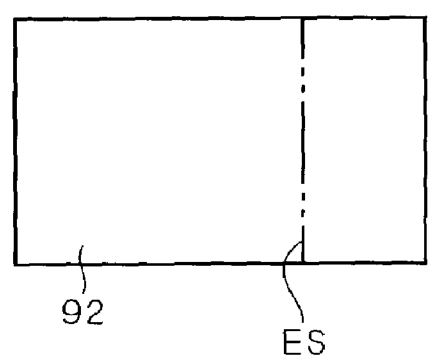
FIG. 40B illustrates exemplary substrate end image data obtained by imaging an untrimmed substrate of glass without through the ND filter.
Figure 40C:
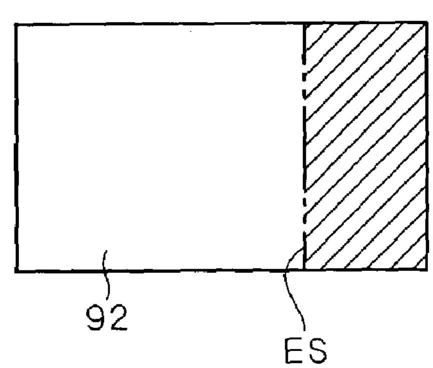
FIG. 40C illustrates exemplary substrate end image data obtained through the ND filter.

FIG. 40A illustrates an inspection stage 40 formed on the basis of this principle. The inspection stage 40 shown in FIG. 40A comprises an ND filter 45 on optical paths of an objective lens 31 and a reflecting mirror 41. The ND filter 45 is arranged downward beyond a substrate 92, as shown in FIG. 40A. FIG. 40B illustrates exemplary substrate end image data obtained by imaging an untrimmed glass substrate 92 without through the ND filter 45. The untrimmed substrate 92 hardly scatters illumination light on a trimmed portion except slight scattering on a substrate edge. Therefore, no trimmed portion of the substrate 92 can be detected in a striped manner dissimilarly to that shown in FIG. 6 and no substrate edge ES can be clearly detected. FIG. 40C illustrates exemplary substrate end image data acquired through the ND filter 45.

Thus, the inspection stage 40 shown in FIG. 40A can readily detect the substrate edge ES by reducing the quantity of illumination light, reflected by the reflecting mirror 41, passing through the outer side of the substrate 92 with the ND filter 45 thereby causing concentration difference. Alternatively, an optical filter causing not concentration difference but color difference may be employed.

While the invention has been shown and described in detail, the foregoing description is in all aspects illustrative and not restrictive. It is therefore understood that numerous modifications and variations can be devised without departing from the scope of the invention.

What is claimed is:

1. A measuring apparatus comprising:

a first detection element detecting an end position of a substrate;

a second detection element detecting an end position of a thin film formed on a region of said substrate, smaller than a first main surface of said substrate; and a calculation element calculating the width between an end of said thin film and an end of said substrate on the basis of said end position of said substrate detected by said first detection element and said end position of said thin film detected by said second detection element.

2. The measuring apparatus according to claim 1, wherein said second detection element comprises a thickness measuring element measuring the thickness of said thin film; and said second detection element detects said end position of said thin film on the basis of the thickness of said thin film measured by said thickness measuring element.

3. The measuring apparatus according to claim 1, wherein said first detection element comprises an imaging part imaging said end of said substrate as first image data; and said first detection element detects said end position of said substrate on the basis of said first image data.

4. The measuring apparatus according to claim 3, wherein an imaging region for said first image data includes said end of said thin film, and said detection element detects said end position of said thin film on the basis of said first image data.

5. The measuring apparatus according to claim 3, further comprising:

a moving mechanism relatively moving said imaging part and said substrate between a substrate end imaging position for acquiring said first image data and a thin film end imaging position for imaging said end of said thin film as said second image data; and a movement vector detection element detecting relative movement vectors of said imaging part and said substrate when said imaging part and said substrate are relatively moved by said moving mechanism, wherein said second detection element detects said end position of said thin film on the basis of said second image data, and said calculation element calculates said width on the basis of said movement vectors, said end position of said substrate and said end position of said thin film.

6. The measuring apparatus according to claim 3, further comprising:

an illumination part illuminating said end of said substrate from the side of a second main surface opposite to said first main surface of said substrate when said imaging part images said end of said substrate.

7. The measuring apparatus according to claim 6, wherein said illumination part comprises a reflecting mirror reflecting illumination light, emitted from the side of said first main surface of said substrate, toward said end of said substrate from the side of said second main surface of said substrate.

8. The measuring apparatus according to claim 6, wherein said illumination part comprises a light source emitting illumination light toward said end of said substrate from the side of said second main surface of said substrate.

9. A measuring apparatus comprising:

a first detection element detecting a plurality of end positions of a substrate for obtaining the position of said substrate from the results of this detection;

a second detection element detecting a plurality of end positions of a thin film formed on a region of said substrate, smaller than a first main surface of said substrate, for obtaining the position of said thin film from the results of this detection; and a comparison element comparing said position of said substrate obtained by said first detection element and said position of said thin film obtained by said second detection element with each other.

10. The measuring apparatus according to claim 9, wherein said first detection element is an element obtaining the central position of said substrate from detected said plurality of end positions of said substrate, said second detection element is an element obtaining the central position of said thin film from detected said plurality of end positions of said thin film, and said comparison element is an element comparing said position of said substrate and said position of said thin film with each other by obtaining the quantity of displacement of the central position of said thin film with respect to the central position of said substrate.

11. The measuring apparatus according to claim 9, further comprising:

an imaging part imaging an end of said substrate as first image data; and an illumination part illuminating said end of said substrate from the side of a second main surface opposite to said first main surface of said substrate when said imaging part images said end of said substrate, wherein said first detection element detects said plurality of end positions of said substrate on the basis of said first image data.

12. A measuring apparatus comprising:

a first detection element detecting a plurality of end positions of a substrate on a plurality of measuring portions respectively;

a second detection element detecting a plurality of end positions of a thin film formed on a region, smaller than a first main surface of said substrate, on said plurality of measuring portions respectively; and a calculation element calculating widths between said plurality of end positions of said thin film and said plurality of end positions of said substrate on said plurality of measuring portions on the basis of said plurality of end positions of said substrate detected by said first detection element and said plurality of end positions of said thin film detected by said second detection element respectively.

13. The measuring apparatus according to claim 12, further comprising:

an imaging part imaging an end of said substrate as first image data; and an illumination part illuminating said end of said substrate from the side of a second main surface opposite to said first main surface of said substrate when said imaging part images said end of said substrate, wherein said first detection element detects said plurality of end positions of said substrate on the basis of said first image data.

* * * * *